US006729929B1

(12) United States Patent
Sayers et al.

(10) Patent No.: US 6,729,929 B1
(45) Date of Patent: May 4, 2004

(54) METHOD AND APPARATUS FOR CONTROLLING WIRELESS NETWORKS

(75) Inventors: Ian Leslie Sayers, Redwood City, CA (US); Paul Jan Long, San Francisco, CA (US); Peter Kendall Cripps, Redwood City, CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/271,596

(22) Filed: Mar. 17, 1999

(51) Int. Cl.[7] .................................................. H04Q 7/20
(52) U.S. Cl. ........................ 445/446; 455/443; 455/444
(58) Field of Search ................................ 455/432, 433, 455/435, 436, 439, 440, 442, 443, 444, 446, 447, 450, 452, 448, 561

(56) References Cited

U.S. PATENT DOCUMENTS

| | | | | |
|---|---|---|---|---|
| 5,212,831 A | * | 5/1993 | Chuang et al. | 455/450 |
| 5,581,597 A | * | 12/1996 | Dent et al. | 455/450 |
| 5,802,473 A | * | 9/1998 | Rutledge et al. | 455/226.1 |
| 6,032,045 A | * | 2/2000 | Mimura | 455/446 |
| 6,038,452 A | * | 3/2000 | Strawczynski et al. | 455/403 |
| 6,112,092 A | * | 8/2000 | Benveniste | 455/450 |
| 6,131,031 A | * | 10/2000 | Lober et al. | 455/443 |
| 6,173,186 B1 | * | 1/2001 | Dalley | 455/446 |
| 6,181,935 B1 | * | 1/2001 | Gossman et al. | 455/432 |
| 6,216,005 B1 | * | 4/2001 | Agrawal et al. | 455/445 |
| 6,223,031 B1 | * | 4/2001 | Naslund | 455/423 |
| 6,253,088 B1 | * | 6/2001 | Wenk et al. | 455/417 |
| 6,256,612 B1 | * | 7/2001 | Vo et al. | 704/201 |

FOREIGN PATENT DOCUMENTS

EP 0766427 A2 4/1997
WO WO 98/02010 1/1998

OTHER PUBLICATIONS

Chuang, J.C.I., "Operation and Performance of a Self–Organizing Frequency Assignment Method for TDMA Portable Radio," *Proceedings of the Global Telecommunications Conference and Exhibition (GLOBECOM), USA*, vol. 2: 1548–1552 (Dec. 1990).

Thom, G.A., "H.323: The Multimedia Communications Standard for Local Area Networks," *IEEE Communications Magazine*, pp. 52–56 (Dec. 1996).

* cited by examiner

*Primary Examiner*—Nay Maung
*Assistant Examiner*—Edan Orgad
(74) *Attorney, Agent, or Firm*—Hamilton, Brook, Smith & Reynolds, P.C.

(57) ABSTRACT

A communications system extending over a cellular region and formed of a plurality of wireless cells. The communications system extends over a cellular region formed of a plurality of wireless cells. Each cell covers an area which includes a portion of the cellular region. Each particular cell includes a base station having a transmitter for transmitting a particular cell signal having parameters including a transmitting frequency and a transmitting power. The particular cell signal is transmitted to cover a portion of the cell region. Each of the base stations includes a parameter detector for detecting the other parameters of the other cell signals from the other cells in the cellular region. A parameter controller controls the particular parameters for the particular cell. The parameters for the particular cell are based upon the other parameters for the other cell signals so that the particular cell signal does not interfere with the other cell signals in the cellular region.

96 Claims, 16 Drawing Sheets

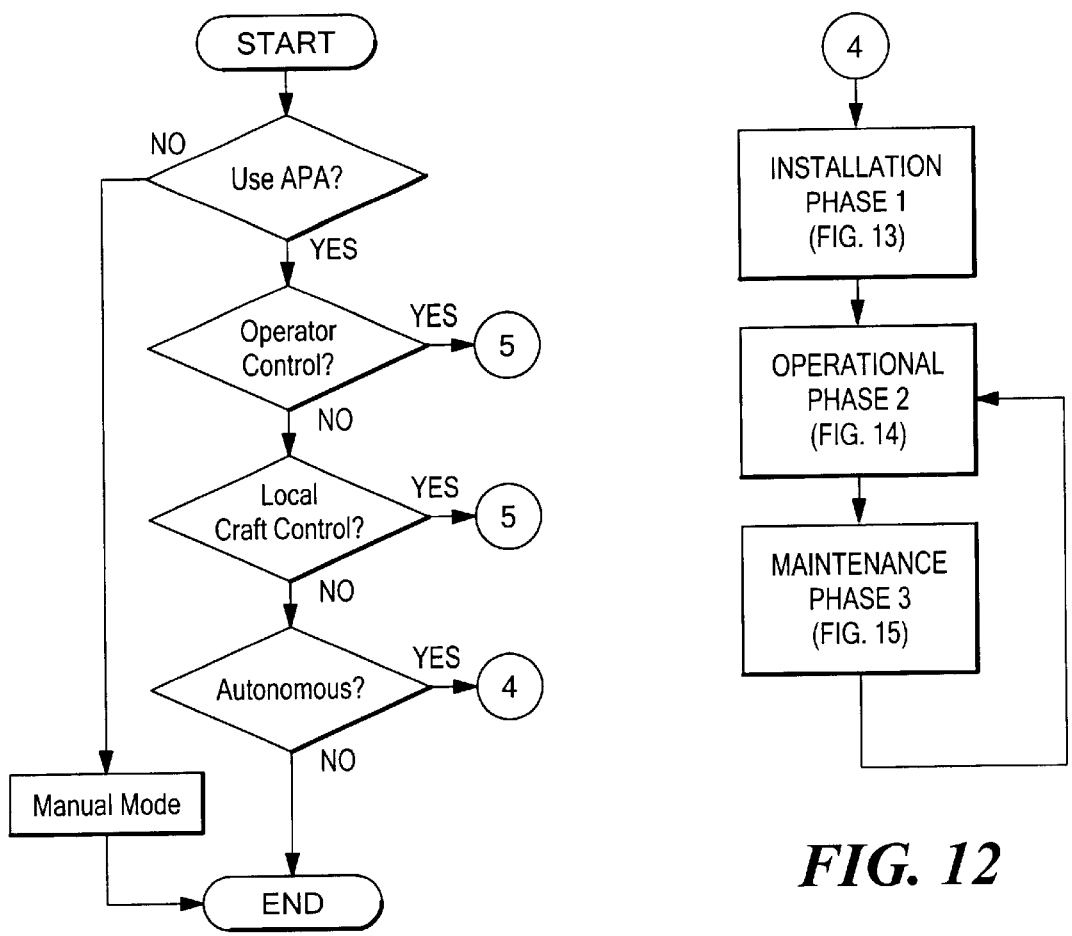
FIG. 10
FIG. 12
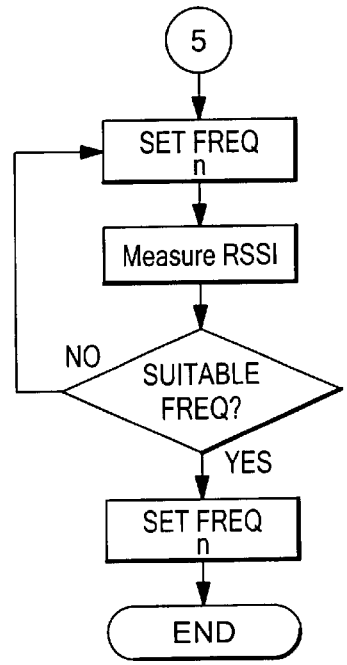
FIG. 11

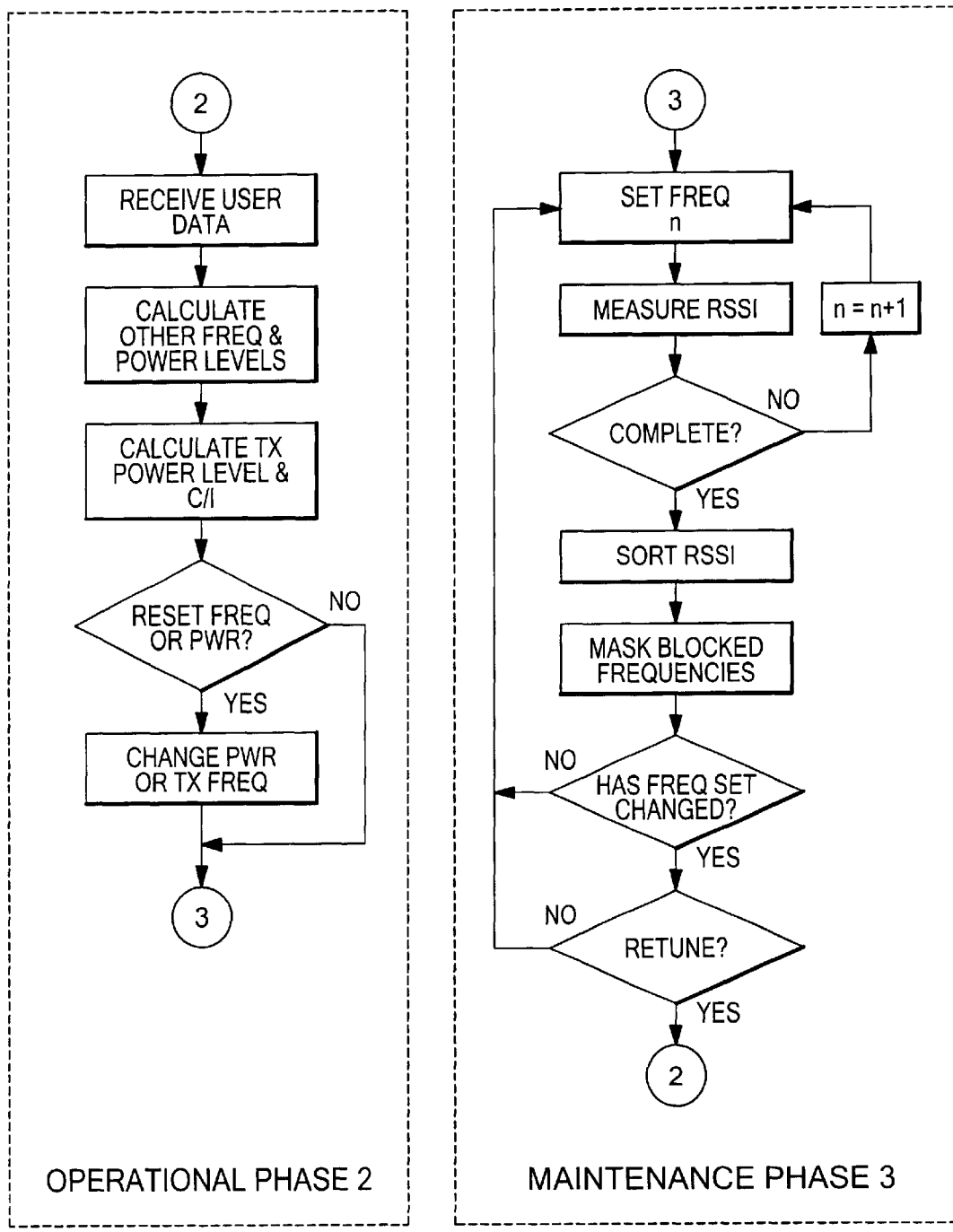
*FIG. 14*  *FIG. 15*

METHOD AND APPARATUS FOR CONTROLLING WIRELESS NETWORKS

CROSS-REFERENCE TO RELATED APPLICATION

Inventors: Ian Leslie Sayers, Paul Jan Long, Sheausong Yang;

SC/Ser. No.: 09/188,856;

Atty Doc. No.: JETC1000DEL.

BACKGROUND OF THE INVENTION

The present invention is a method and apparatus that provides for the installation and setup of wireless networks.

Conventional Cellular Systems

Present day cellular mobile telephone systems provide for a large and increasing demand for mobile services. Cellular systems "reuse" frequency within a group of cells to provide wireless two-way radio frequency (RF) communication to large numbers of users. Each cell covers a small geographic area and collectively a group of adjacent cells covers a larger geographic region. Each cell has a fraction of the total amount of RF spectrum available to support cellular users. Cells are of different sizes (for example, macro-cell or micro-cell) and are generally fixed in capacity. The actual shapes and sizes of cells are complex functions of the terrain, the man-made environment, the quality of communication and the user capacity required. Cells are connected to each other via land lines or microwave links and to the public-switched telephone network (PSTN) through telephone switches that are adapted for mobile communication. The switches provide for the hand-off of users from cell to cell and thus typically from frequency to frequency as mobile users move between cells.

In conventional cellular systems, each cell has a base station with RF transmitters and RF receivers co-sited for transmitting and receiving communications to and from cellular users in the cell. The base station employs forward RF frequency bands (carriers) to transmit forward channel communications to users and employs reverse RF carriers to receive reverse channel communications from users in the cell.

The forward and reverse channel communications use separate frequency bands so that simultaneous transmissions in both directions are possible. This operation is referred to as frequency division duplex (FDD) signaling. In time division duplex (TDD) signaling, the forward and reverse channels take turns using the same frequency band.

The base station in addition to providing RF connectivity to users also provides connectivity to a Mobile Services Switching Center (MSC). In a typical cellular system, one or more MSCs will be used over the covered region. Each MSC can service a number of base stations and associated cells in the cellular system and supports switching operations for routing calls between other systems (such as the PSTN) and the cellular system or for routing calls within the cellular system.

Base stations are typically controlled from the MSC by means of a Base Station Controller (BSC). The BSC assigns RF carriers to support calls, coordinates the handoff of mobile users between base stations, and monitors and reports on the status of base stations. The number of base stations controlled by a single MSC depends upon the traffic at each base station, the cost of interconnection between the MSC and the base stations, the topology of the service area and other similar factors.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there may be a transfer period of time during which the forward and reverse communications to the mobile user are severed with the base station for the first cell and are not established with the second cell.

Conventional cellular implementations employ one of several techniques to reuse RF bandwidth from cell to cell over the cellular domain. The power received from a radio signal diminishes as the distance between transmitter and receiver increases. Conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere with the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods. The Global System for Mobile Communications (GSM), PCS1900, IS-136, and PDC standards are examples of TDMA methods in current use.

The present specification uses a GSM system for purposes of explanation but the present invention applies to any wireless system protocol.

GSM Cellular Systems

The GSM system architecture is described, for example, in detail by M. Mouly and M.-B. Pautet, The GSM System for Mobile Communications, 1992 and Mouly and M.-B. Pautet, GSM Protocol Architecture: Radio Sub-system Signaling, IEEE 41st Vehicular Technology Conference, 1991. The following sections highlight some unique aspects of GSM systems.

The GSM system specifications incorporate many advanced services and features including:

ISDN compatibility based upon Q.931

World-wide roaming with other GSM networks

Two way messaging

Data Services

FAX Services

ISDN Supplementary Services.

However, the GSM system is designed fundamentally for use in a traditional Circuit Switched environment that uses 64 kbps voice and data transport.

GSM System Architecture

The standard GSM network includes three major components, namely, the Mobile Station (MS), Base Station Sub-System (BSS) and the Network Sub-System (NSS). The GSM Specifications define the network entities and their associated interfaces within the Public Land Mobile Network (PLMN). The complete suite of specifications also includes documents that define the type approval procedures for mobile stations allowing mobile stations to be used in different countries, independently of the country in which they were type approved.

Base Station Subsystem (BSS)

The Base Station Subsystem (BSS) is composed of two main parts, the Base Transceiver Station (BTS) and the Base Station Controller (BSC). The BTS includes the radio transceivers that define the radio cell boundary and handles the radio (Um) interface protocols with the mobile station. There are a number of different cell types, macro, micro and pico, that can be deployed dependent on the terrain, subscriber density and coverage requirements. The macro cell is intended for large cell sizes with ranges from 2 km to 70 km. The micro cell is intended to provide cell sizes from 100 m to 5 km, either as an in fill or in areas serving a high density of subscribers. The pico cells are intended to support cell sizes in the range 50 m to 1 km and will be used to provide high quality local radio coverage. The BTS supports all the required channel coding, encryption and speech coding required by the radio interface. The speech transcoding may be performed locally at the BTS or remotely at the BSC or MSC. If remote transcoding is used, then the BTS is still required to control this function.

The Base Station Controller (BSC) manages the radio resources of one or more BTSs across the Abis interface. The BSC controls most of the features of the radio network, including allocation of radio time slots to a mobile station, release of the resources, interpretation of measurement results and control of radio interface handovers. The BSC interfaces to the NSS via the A-interface to the MSC.

Radio Transmission

The BTS is responsible for maintaining the radio link with the GSM Mobile station. Currently the GSM system can support three frequency bands at 900, 1800 and 1900 MHz. However in each band the physical TDMA structure is identical. Each RF carrier is divided into eight time slots using TDMA. Groups of eight consecutive time slots form TDMA frames.

There are two types of logical channels that are sent over the physical radio interface and these are Traffic channels and Common Control Channels. The traffic channels provide a bi-directional point-to-point transmission link to a mobile station. Full-rate Traffic Channels (TCH/F) and half-rate Traffic Channels (TCH(H) are allocated together with a low bit-rate Slow Associated Control Channel (SACCH), which typically transmits measurements needed for handover decisions. There are also eighth-rate Traffic Channels, also called Stand-alone Dedicated Control Channels (SDCCH), which are used primarily for transmitting location updating information. In addition, a TCH slot can be pre-empted for signaling, in which case it is called a Fast Associated Control Channel (FACCH), which can be either full-rate or half-rate TCHs.

Common channels can be accessed both by idle mode mobiles, in order to change to dedicated mode, and by dedicated mode mobiles, to monitor surrounding base stations for handover information. The common channels, which are defined include:

Broadcast Control Channel (BCCH)

Continually broadcasts, on the downlink, information including base station identity, frequency allocations, and frequency-hopping sequences.

Frequency Correction Channel (FCCH) and Synchronization Channel (SCH)

Used to synchronize the mobile to the time slot structure of a cell by defining the beginning of a TDMA frame.

Random Access Channel (RACH)

Slotted Aloha channel used by the mobile to request access to the network.

Paging Channel (PCH)

Used to alert the mobile station of incoming call.

Access Grant Channel (AGCH)

Used to allocate an SDCCH to a mobile for signaling (in order to obtain a dedicated channel), following a request on the RACH.

Speech and Channel Coding on the Radio Interface

Speech in GSM is digitally coded at a rate of 13 kbps, so-called full-rate speech coding. This rate is efficient compared with the standard ISDN rate of 64 kbps. In addition, GSM also supports a half-rate speech code operating at around 7 kbps, effectively doubling the capacity of a network.

This 13 kbps digital stream is split into (260 bits every 20 ms). This data contains some forward error correction raising the gross bit rate after channel coding to 22.8 kbps (or 456 bits every 20 ms). These 456 bits are divided into eight 57-bit blocks, and the result is interleaved amongst eight successive time slot bursts for protection against burst transmission errors.

Each time slot burst is 156.25 bits and contains two 57-bit blocks, and a 26-bit training sequence used for equalization. A burst is transmitted in 0.577 us for a total bit rate of 270.8 kbps, and is modulated using Gaussian Minimum Shift Keying (GMSK) onto a 200 kHz carrier frequency. The 26-bit training sequence (TSC) is of a known pattern that is compared with the received pattern to perform a channel estimation. This channel estimation is then used to recover the received signal. Forward error control and equalization contribute to the robustness of GSM radio signals against interference and multipath fading.

Network Subsystem

An essential component of the Network Subsystem is the Mobile services Switching Center (MSC). The MSC provides the functions required to switch calls to/from the mobile user and the PSTN or ISDN fixed network. In addition the MSC also provides the functions needed to track and maintain communication with a mobile subscriber, these include registration, authentication, location updating, inter-MSC handovers, and call routing to a roaming subscriber. In order to adequately maintain contact with the network subscribers the GSM PLMN employs a number of databases. The main database functions are provided by two Location Registers, known as the Home location Register (HLR) and Visitor Locations Register (VLR).

The Home Location Register (HLR) contains all the information related to an operators subscriber database. The HLR is the main database for a network. The HLR stores both static and dynamic data related to the subscriber. Static data includes items such as International Mobile Subscriber Identity, subscriber MSISDN number and registered supplementary services. Dynamic data includes, for example, current location of the mobile user, in terms of VLR and MSC E. 164 Number, and call forwarding numbers. The HLR downloads the required data to a VLR database when a Mobile User registers in a VLR area, it also provides the necessary functionality to terminate mobile calls.

The Visitor Location Register (VLR) stores the subscribers data, downloaded from the HLR, for mobile stations currently located in the VLRs area. The data stored in the VLR may include information from the Home HLR and foreign HLRs. The VLR is used to provide both Mobile Originated and Mobile Terminated call functionality. The VLR is defined as an independent database in GSM, however in order to optimize system performance many implementations combine MSC and VLR functionality, this effectively makes the MSC and VLR areas identical.

The remaining two databases are associated with security aspects of the network. The Authentication Center (AUC) is a secure database used to provide authentication keys, based upon a secret key (ki), to the HLR and subsequently the VLR for verifying the validity of the users subscription. The algorithm (A3) used to perform the authentication of the subscriber is stored in the users Subscriber Identity Module card and Authentication Center (AUC), only the challenge and result are sent on the radio interface. The challenge is also used by another algorithm (A8) to generate the key required by the A5 radio interface encryption algorithm. Although GSM defines possible A3 & A8 algorithms they are more realistically defined by the operator. The remaining database is the Equipment Identity Register (EIR) which contains a list of valid International Mobile Equipment Identity (IMEI) values. The database can therefore be used to control the use of stolen, non-type approved or faulty mobile equipment. When a mobile subscriber registers with the network the IMBI can be obtained and validated against the EIR data. If the IMEI is blacklisted, then action can be taken to prevent network access by the user.

Operations and Maintenance

Associated with the BSS and NSS equipment are Operations and Maintenance Center, OMC-R and OMC-S, respectively. The OMC-R provides the operations and maintenance control of the GSM BSS functions. The OMC-R is used to perform the following functions:

Configuration of the Cells, this includes allocation of radio frequency, handover parameters, cell parameters and timer values.

Performance monitoring. This function allows the OMC-R to receive statistical information about the various aspects of the BSS, such as number of calls, numbers of handovers etc.

Alarm reporting. The OMC-R is used to view and handle various alarms that are originated by the BSS. These may include hardware or software failures, loss of connections, etc Software Download. The OMC-R is responsible for providing and updating the software load to the BSS.

The NSS equipment is associated with the OMC-S. The OMC-S provides the same type of high level functions as the OMC-R. In addition the OMC-S may be used to provide user data administration for the HLR and VLR. However this function is more usually provided by a dedicated Administration Center which can also deal with Billing Server requirements and SIM data.

Services Provided by GSM

GSM was designed with ISDN interoperability as a pre-requisite, consequently the services provided by GSM are a subset of standard ISDN services, however this is rapidly eroding as more ISDN services are developed within the GSM format. The GSM system provides a range of Basic and Supplementary Services. The Basic Services are further sub-divided into Teleservices and Bearer Services.

The Teleservices include:
Speech, the most basic service
Short Message, a two way messaging service
Group 3 FAX, this services allows connection to Group 3 FAX machines
Cell Broadcast, this service allows messages to be broadcast to the mobile stations.

The Bearer Services include:
Asynchronous Data 300–14400 bps, allows access to normal V-Series Modems
Synchronous Data 300–14400 bps, allows access to CSP-DNs
PAD Services
Packet Services The Supplementary Services are intended to enhance the functionality of the Basic Services. The Phase 1 specifications only provide Call Forwarding and Call Barring Services. The Phase 2 Supplementary services included Line identification services, advice of charge, multi-party, call waiting and call hold. The Phase 2+ services will include Call Transfer, Call Completion Busy Subscriber (CCBS) and Optimal routing capabilities independent as possible from the underlying specifics of the mobile network. Another sublayer is Supplementary Services, which manages the implementation of the various supplementary services, and also allows users to access and modify their service subscription. The final sublayer is the Short Message Service layer, which handles the routing and delivery of short messages, both from and to the mobile subscriber.

Problems with the Existing GSMITDMA Installation Procedures

As wireless technology becomes more popular, corporations and other entities having private networks desire to make their workers mobile with the ability to access information via wireless devices. However, in order to plan a cellular network it has been necessary to perform the steps listed below:

Network Dimensioning. This stage require precise demographic estimates. Demographic estimates are difficult to make for indoor environments and for dense outdoor environments.

Antenna Site determination. Accurate terrain models or building plans are required.

System Installation. The use of plans generated in the previous stages are required to undertake this stage.

Performance Optimization. This stage involves the real time monitoring of the network and field engineers to determine any optimizations that may be required. In addition it may also be necessary to gather data from the network while in service to correct or enhance performance.

Each one of these steps can take a long time, especially when collecting the raw data for the deployment region. The planning exercise then uses this data to determine optimum cell locations.

The quality of the generated cell plan is dependent on the quality of the data collected and hence, the need for an optimization phase after deployment. This planning/deployment cycle is time consuming and prone to error when only a few hundred cells are involved in the process. When this process is scaled up to support the mass deployment of radio cells in an indoor and outdoor environment, the problem becomes intractable. Recognizing these problems, there is a need for methods and apparatus that:

Reduce the complexity of cell planning indoors and outdoors,

Optimization of a mixed cell environments (for example, Macro, Micro and Pico),

Informing the management system of potential frequency conflicts,

Negating the need for use of cumbersome cell planning tools.

In order to effectively deploy large numbers of radio cells efficiently, the ability to perform real time frequency planning within a cellular network is required and is desired to remove time-consuming and error-prone steps.

In accordance with the above background, it is an object of the present invention to provide wireless systems that are compatible with conventional cellular systems and with corporate networks including local area networks and the Intranet.

SUMMARY OF THE INVENTION

The present invention is a method and apparatus for the control, including installation, setup and tuning, of wireless networks in a communication system. The communications system extends over a cellular region formed of a plurality of wireless cells. Each cell covers an area which includes a portion of the cellular region. Each particular cell includes a base station having a transmitter for transmitting a particular cell signal having parameters including a transmitting frequency parameter and a transmitting power parameter. The particular cell signal is transmitted to cover a portion of the cell region. Each of the base stations includes a parameter detector for detecting the other parameters of the other cell signals from the other cells in the cellular region. A parameter controller controls the particular parameters for the particular cell. The parameters for the particular cell are based upon the other parameters for the other cell signals so that the particular cell signal does not interfere with the other cell signals in the cellular region.

In one embodiment, the present invention includes a local area network (LAN) for interconnecting the base stations of the communications system whereby cell parameters, and other network information, are exchanged.

In one embodiment, the parameter detector includes an RF scanner for scanning the other cell signals from the other cells in the cellular region and a processor for processing the other cell signals to determine the other parameters for the other cell signals.

In one embodiment, the parameter detector includes a local area network connection for connecting to other base stations in the other cells in the cellular region to obtain the other parameters for the other cell signals from the other cells in the cellular region.

In one embodiment, the base station processor includes a control algorithm for automatic parameter assignment of the particular parameters wherein the control algorithm selects among operator control, local craft control and autonomous control modes of operation. The autonomous control mode includes an installation phase for installing the base station with the particular parameters, an operational phase for changing the particular parameters and a maintenance phase for measuring other parameters for the other cells.

In one embodiment, the base station processor control algorithm has an autonomous control mode for automatic parameter assignment of the particular parameters where the control algorithm operates to detect a radio hole created by a disappearance of one of the other cell signals and to adjust the particular parameters of the particular cell signal to compensate for the disappearance.

In one embodiment, the base station processor control algorithm has an autonomous control mode for automatic parameter assignment of the particular parameters where the control algorithm operates to detect a new radio signal created by an appearance of a new one of the other cell signals and to adjust the particular parameters of the particular cell signal to compensate for the appearance.

The present invention is useful in a communication system formed by a private network that includes a private wireless network. The communication system also is useful in a public wireless network using a public wireless protocol, such as GSM, TDMA, or CDMA that is typically connected to other public networks, such as PSTN, ISDN and the Internet, using a wired protocol, such as IP.

The private network also typically includes a local area network (LAN) and the private network typically connects to the public networks using a wired packet protocol, such as IP.

In connection with the present invention, the public and private wireless networks operate with the same public wireless protocol, such as GSM or TDMA, and the private wireless network additionally operates with a wired packet protocol, such as IP.

The private wireless network uses private base stations (P-BTS) which include software for a wireless protocol, such as GSM or TDMA, include software for private network operation with a wired protocol, such as IP.

The communication system permits users to operate freely in both public and private wireless networks using standard mobile stations while achieving high private network data rates. The communication system typically uses normal wireless handsets or other mobile or fixed stations without need for any modifications.

The private base stations (P-BTS) in one embodiment are directly connected to a private LAN and thereby enable standard wireless stations to make and receive calls over the LAN. Also, the range of calls, using standard Internet protocols, extends between LANs and between different corporations over the Internet without requiring the support of a switch (e.g. MSC). The wireless stations can freely roam between the public wireless network and the private wireless network and a single telephone number can be assigned to a mobile station for use in both the public and the private wireless networks. Notwithstanding, this patent is directly applicable to the public cellular network should the operator decide to employ this technology for public frequency planning.

The foregoing and other objects, features and advantages of the invention will be apparent from the following detailed description in conjunction with the drawings.

BRIEF DESCRIPTION OF THE DRAWINGS

FIG. 10 depicts a flow diagram of the sequencing to select operational modes.

FIG. 11 depicts a flow diagram of the manual operation mode of a frequency selection algorithm.

FIG. 12 depicts a flow diagram of the phases of automatic operation.

FIG. 14 depicts a flow diagram of the operational phase.

FIG. 15 depicts a flow diagram of the maintenance phase.

DETAILED DESCRIPTION

Figure 1:
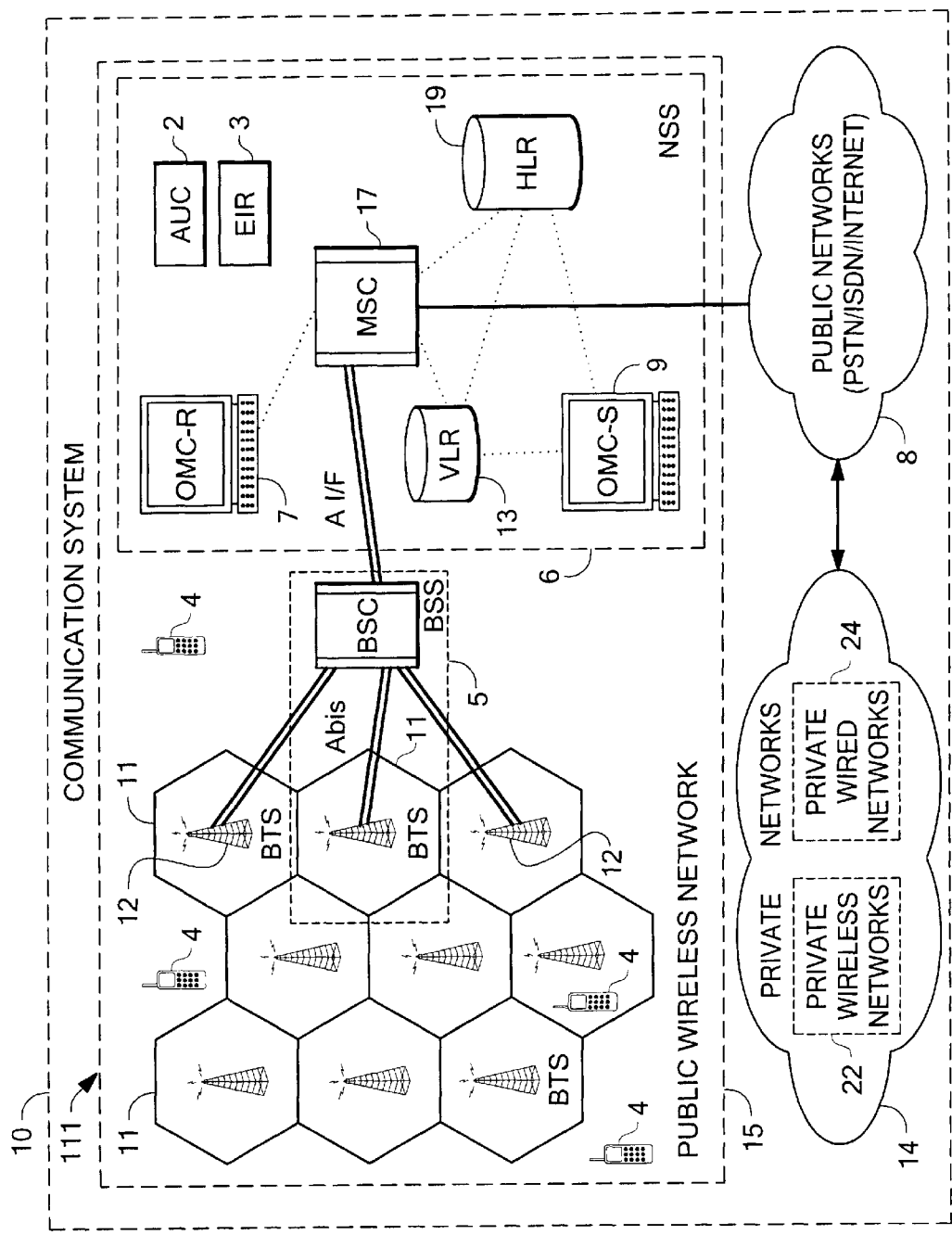
FIG. 1 is a block diagram representation of a communication system including a public wireless network, other public networks such as PSTN, ISDN and the Internet and including a private network.

Communication System—FIG. 1

In FIG. 1, the communication system 10 includes a conventional public wireless network 15, conventional public networks 8 (such as PSTN, ISDN and the Internet) and private networks 14. The public wireless network 15 includes the ability to communicate in a conventional manner with conventional wireless mobile stations 4. The private network 14 includes the ability to communicate with the conventional mobile stations 4 and provides additional private network capabilities not provided by the conventional public wireless network 15.

The conventional public wireless network 15 of FIG. 1 includes the mobile stations (MS) 4, Base Station Sub-System (BSS) 5 and the Network Sub-System (NSS) 6. The Base Station Subsystem (BSS) 5 is composed of the Base Transceiver Stations (BTSs) 12 and the Base Station Controller (BSC) 16. Each of the BTSs 12 includes a radio transceiver that defines the radio boundary of a cell 11 and handles the radio (Um) interface protocols with the mobile stations 4.

The cells 11, in the wireless public network 15, of FIG. 1 each exist over a different area and together the cells 11 collectively exist over a larger area designated as a region 1I1. Each cell 11 in the region 1I1 uses frequencies that are isolated from the frequencies of other cells in the region. As mobile stations 4 travel from one of the cells 1I1 to another one of the cells 11, a frequency handover occurs.

The private networks 14 of FIG. 1 also include private BTS (P-BTS) within the private wireless networks 22 for communications with mobile stations 4 located within the private networks. The cells within the domain of the private networks 14 of FIG. 1 are also within the range of one or more of the cells 11 of the public wireless network 15 of FIG. 1. Typically, the allocation of frequency spectrum in different regions is under governmental control and frequency spectrum is allocated to different entities in different regions of a country. The owner of the rights to particular frequencies in a region including public wireless network 15 and private wireless networks 22 controls the allocation of frequencies among public cells and the private cells.

The Base Station Controller (BSC) 16 manages the radio resources of one or more BTSs across an Abis interface. The BSC 16 controls the radio network, including allocation of radio time slots to mobile stations 4, release of resources, interpretation of measurement results and control of radio interface handovers. The BSC 16 interfaces to the NSS 6 via an A-interface to MSC 17.

The Network Subsystem (NSS) 6 includes the Mobile services Switching Center (MSC) 17 that provides the functions required to switch calls to/from the mobile stations 4 and the fixed public networks 8 (including PSTN and ISDN). In addition, the MSC 17 also provides the functions needed to track and maintain communication with mobile stations 4 and these include registration, authentication, location updating, inter-MSC handovers, and call routing to roaming mobile stations 4. The GSM/TDMA/CDMA/ cellular system employs a Home Location Register (HLR) 19 and a Visitor Location Register (VLR) 13, an Authentication Center (AUC) secure databade 2 and an Equipment Identity Register (EIR) 3. The Operations and Maintenance Center includes the OMC-R 7 and the OMC-S 9.

Figure 2:
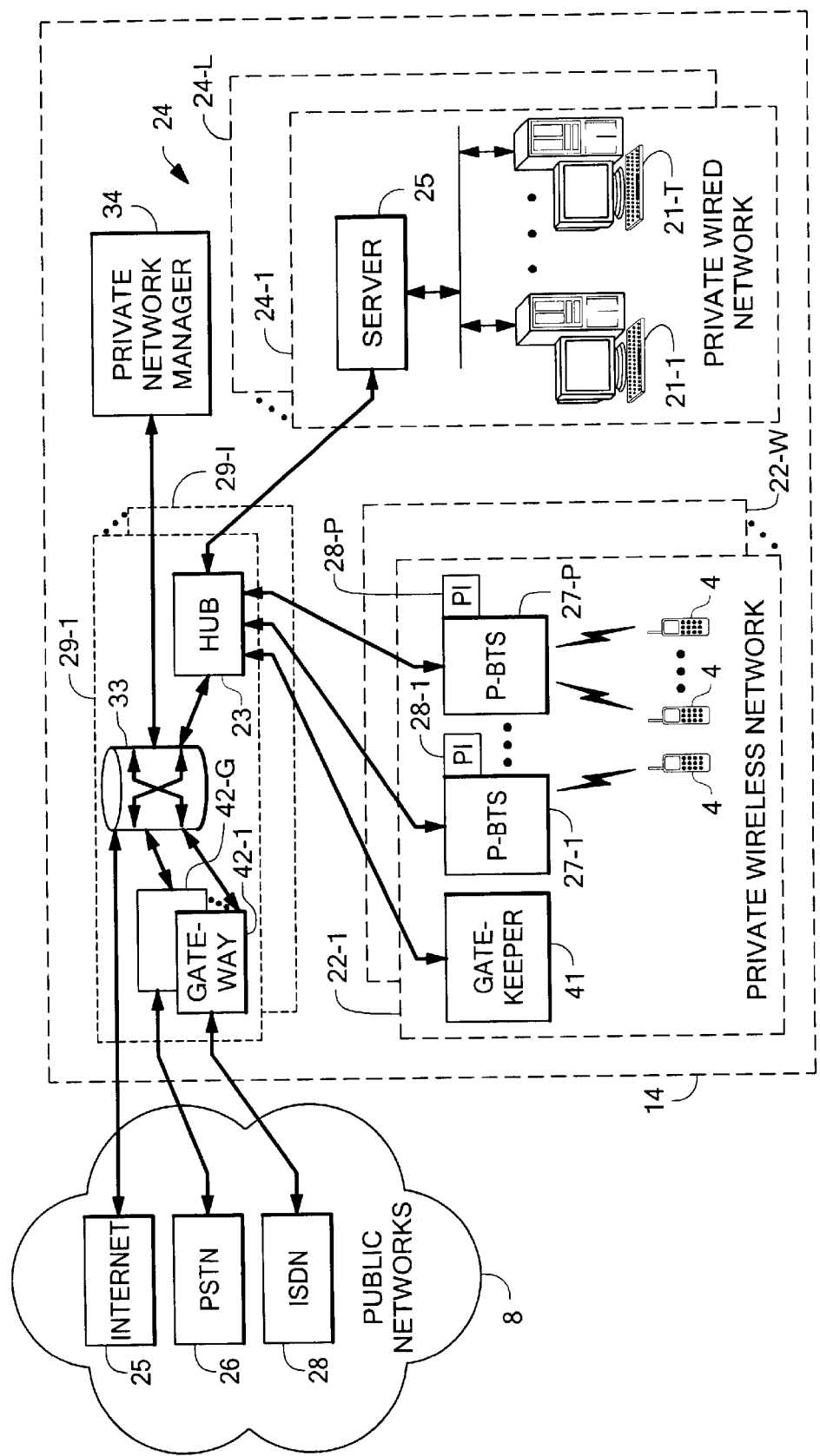
FIG. 2 depicts further details of the networks of FIG. 1.

Private Networks—FIG. 2

In FIG. 2, private network 14 is typical of private networks 14 of FIG. 1 and includes the private wireless networks 22 of FIG. 1 (including private wireless networks 22-1, . . . , 22-W), private wired networks 24 (including local area networks, LANs, 24-1, . . . , 24-L), and connection units 29 (including connection units 29-1, . . . , 29-I). The private network 14 in FIG. 2 can include wide area networks (WAN) and any other type of network presently or hereafter available. The connection unit 29 includes a hub 23 for interconnecting the private wireless networks 22 and the LANs 24 and for connecting the private network 14 to the public networks 8. The hub 23 connects to the router 33 that directs calls among the public network facilities including the ISDN 28, . . . , PSTN 26 and the Internet 25 and the private network 14. The private network 14 uses the same protocol as the Internet 25 and connects directly without need for a separate gateway. The connection unit 29 includes gateways 42-1, 42-2, . . . , 42-G for connecting the ISDN 28 and the PSTN 26 which use different protocols than the private networks 14.

In FIG. 2, the private wireless networks 22 include the wireless capabilities of the public wireless network 15 of FIG. 1. In addition, the private wireless network 14 operates with advanced technologies that are not yet available publically. Current advanced technologies operate with rates of 384 kb/s and are approaching rates of 2 Mb/s for W-CDMA. In FIG. 1, wireless communications between the public BTSs 12 and mobile stations 4 operate with a wireless protocol such as GSM/TDMA/CDMA. In FIG. 2, wireless communications between the private P-BTSs 27 and mobile stations 4 for convenience and comparability operate with the same wireless protocol (such as GSM/TDMA/CDMA) as used by the public BTSs 12 in the public wireless network 15.

In FIG. 2, the local area networks (LANs) 24 are private wired networks operating with a wired packet protocol such as IP. LAN 24-1 is typical and includes, for example, a server 25 and LAN terminals 21 (including terminals 21-1, . . . , 21-T). Terminals 21-1, . . . , 21-T communicate with each other and with the public networks 8 through connection unit 29-1 using the wired packet protocol.

In FIG. 2, the P-BTSs 27-1, . . . , 27-P are associated with protocol converters 28-1, . . . , 28-P, respectively, that connect P-BTSs 27-1, . . . , 27-P to connection unit 23 using the private network protocol used by the LANs 24 and the connection unit 23. Therefore, the mobile stations 4 communicating through the P-BTSs 27 in the private networks 14 have access to the terminals 21 in LANs 24 and have access to the public networks 8. Further, the P-BTSs 27 in the private wireless networks 14 have available higher data rates than those available through the BTSs 12 in the public wireless network 15. In the example described in the present specification, private rates up to 384 kbps or higher are possible whereas conventional public cellular networks only provide rates up to 64 kbps. Accordingly, data retrieval operations in the private networks 14 are better accommodated than in the public wireless network 15 of FIG. 1.

In FIG. 2, the wireless P-BTS 27 directly connect the mobile stations 4 through connection unit 23 to other facilities in private networks 14 and thereby permit, for example, the mobile stations 4 to send and receive calls to and from the terminals 21 in the LAN networks 24. Furthermore, the range of calls from and to mobile stations 4 in the private wireless network 22, using standard Internet protocols (IP), extends over the Internet in public networks 8 to any Internet facility such as different LANs and different corporations in different regions or countries.

The private wireless networks 22 in FIG. 2 do not require the internal support of a circuit switch from the public networks and therefore, the private networks 14 in the FIG. 2 system can easily grow to accommodate new user requirements under control of the owners of the private networks 14.

In the private networks 14 of FIG. 2, the mobile stations 4 are typically unmodified, conventional wireless mobile station handsets like those widely used in conventional public wireless networks and therefore the mobile stations 4 can freely move between the public wireless network 15 of FIG. 1 and the private wireless networks 22 of FIG. 2 without restriction. Because of this free movement capability, only a single number is required for each mobile station 4 for both private wireless network communications and for public wireless network communications.

The private wireless networks 22 of FIG. 2 have P-BTSs 27-1, . . . , 27-P which correspond to P cells in the private wireless domain. The allocation of frequencies among the public wireless network cells and the private network cells is determined by agreement of the owners of the public wireless network 15 and the private networks 14.

Figure 3:
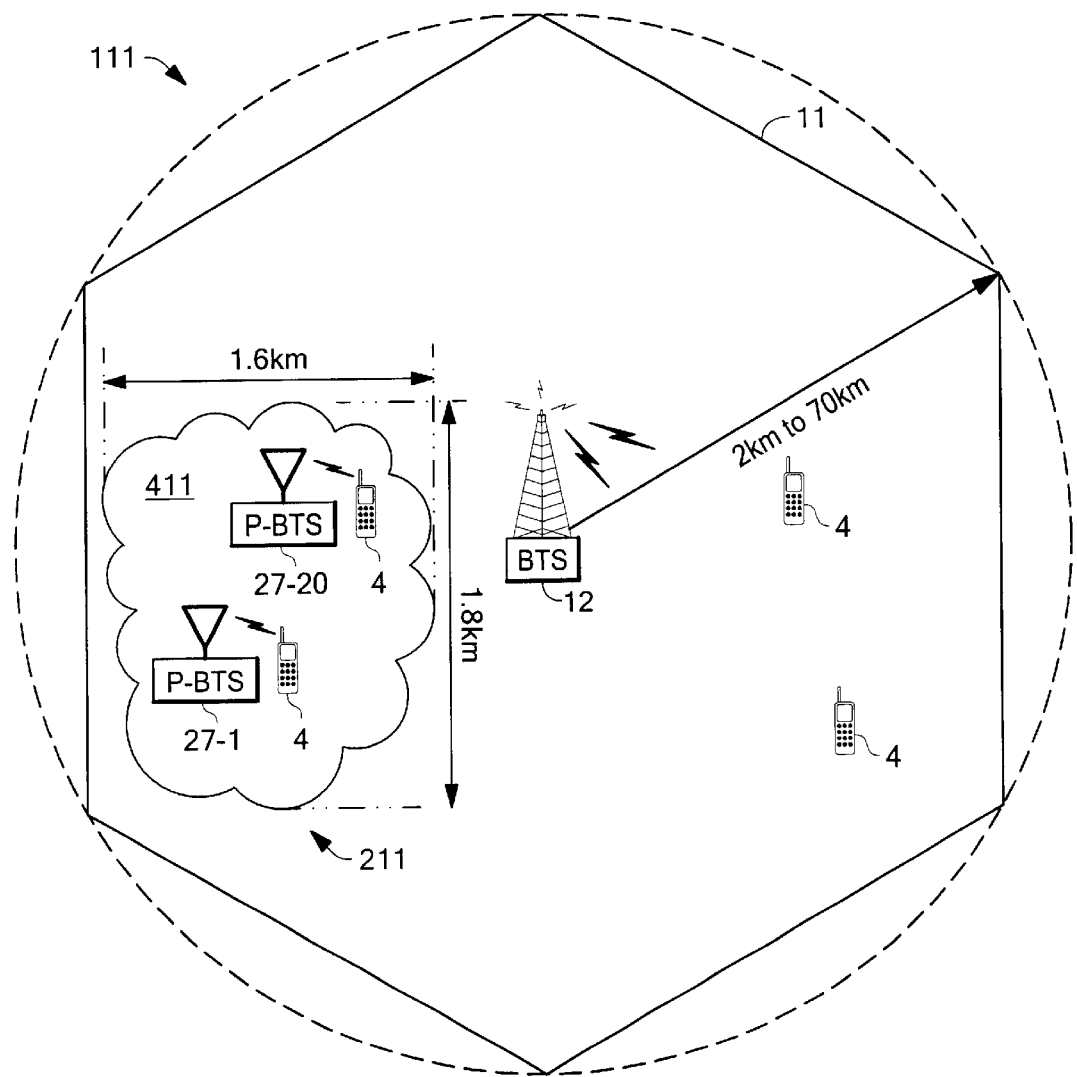
FIG. 3 depicts a private wireless region within a cell of a public wireless region.

Private And Public Overlapping Regions—FIG. 3

FIG. 3 depicts a private wireless region 211 within a cell 11 of a public wireless region 111. The private wireless region 211 is formed by a group of private cells 411 that cover an area of approximately 1.6 km by 1.8 km in the cell 11 of the public wireless network region 111. The cell 11 of the public wireless network region 111 typically covers a range defined by a radius of from 2 km to 70 km. Although region 211 is shown in FIG. 3 as being entirely within a single cell 11, region 211 can fall within several cells of the public wireless network region 111 of FIG. 1. The allocation of frequency spectrum among the cells 11 in the public wireless network region 111 and the cells 411 in the private wireless network region 211 must be allocated so as not to create unacceptable interference among the public and private cells. The users 4 in FIG. 3 typically are free to move any where in the public wireless network region 111 for connection using the frequencies of the public wireless network and are free to move any where in the private wireless network region 211 for connection using the frequencies of the private wireless network.

Figure 4:
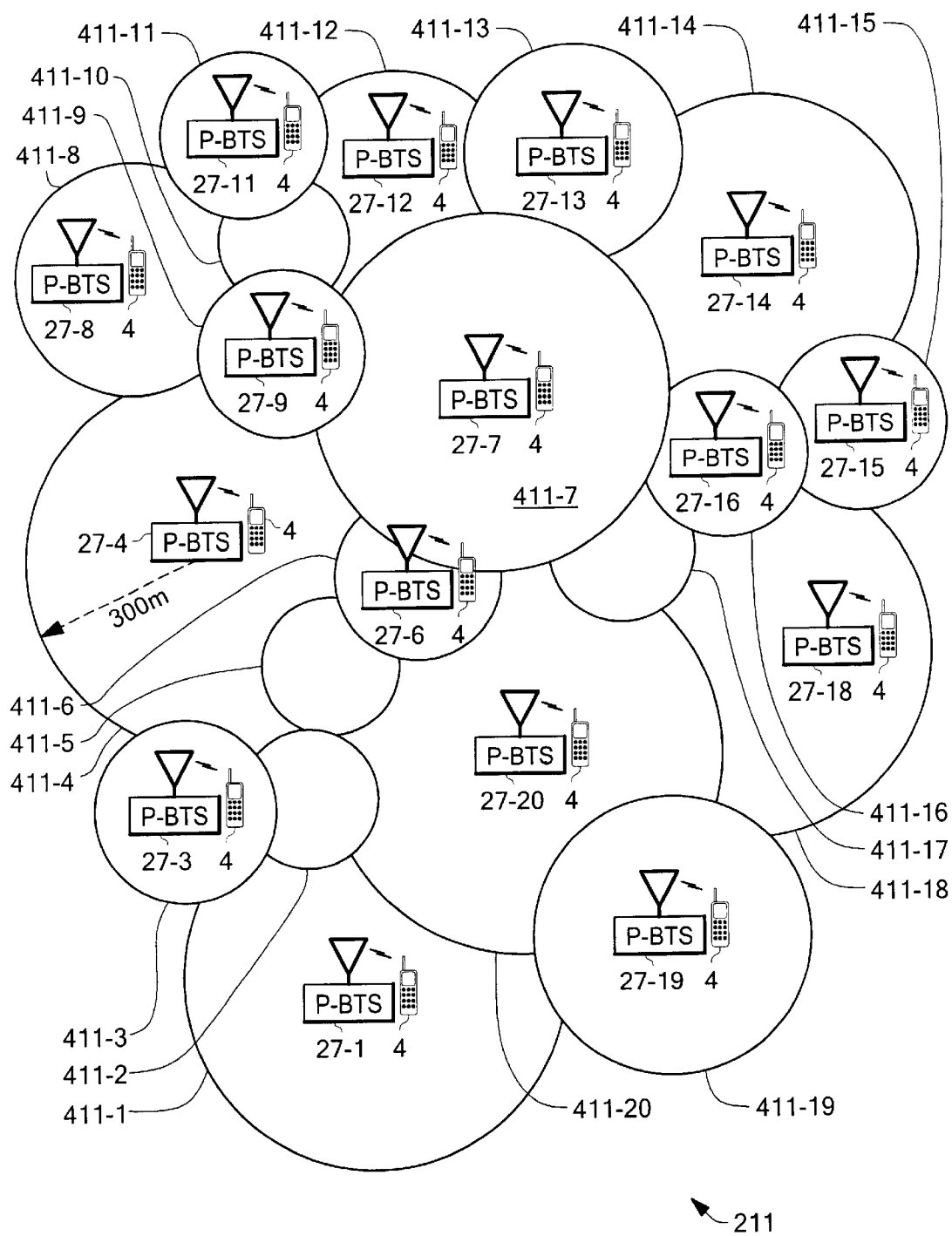
FIG. 4 depicts a representation of the cells forming the private wireless region of FIG. 3.

Private Region—FIG. 4

In FIG. 4, the private region 211 of FIG. 3 is shown in further detail. The private region 211 includes a number of private cells 411, including the cells 411-1, . . . , 411-20. Each of the private cells 411 is like one of the public cells 11 in the public wireless network 15 of FIG. 1 although the private cells 411 generally cover smaller areas than the public cells 11. The cells 411-1, . . . , 411-20 have the corresponding private BTS (P-BTS) 27-1, . . . , 27-20. The users 4 of FIG. 4 are free to move to any of the private cells 411-1, . . . , 411-20 of FIG. 4 or to any of the cells 11 in the public wireless network of FIG. 1. When a user 4 moves from one cell to another, whether public or private, an appropriate handover occurs.

Figure 5:
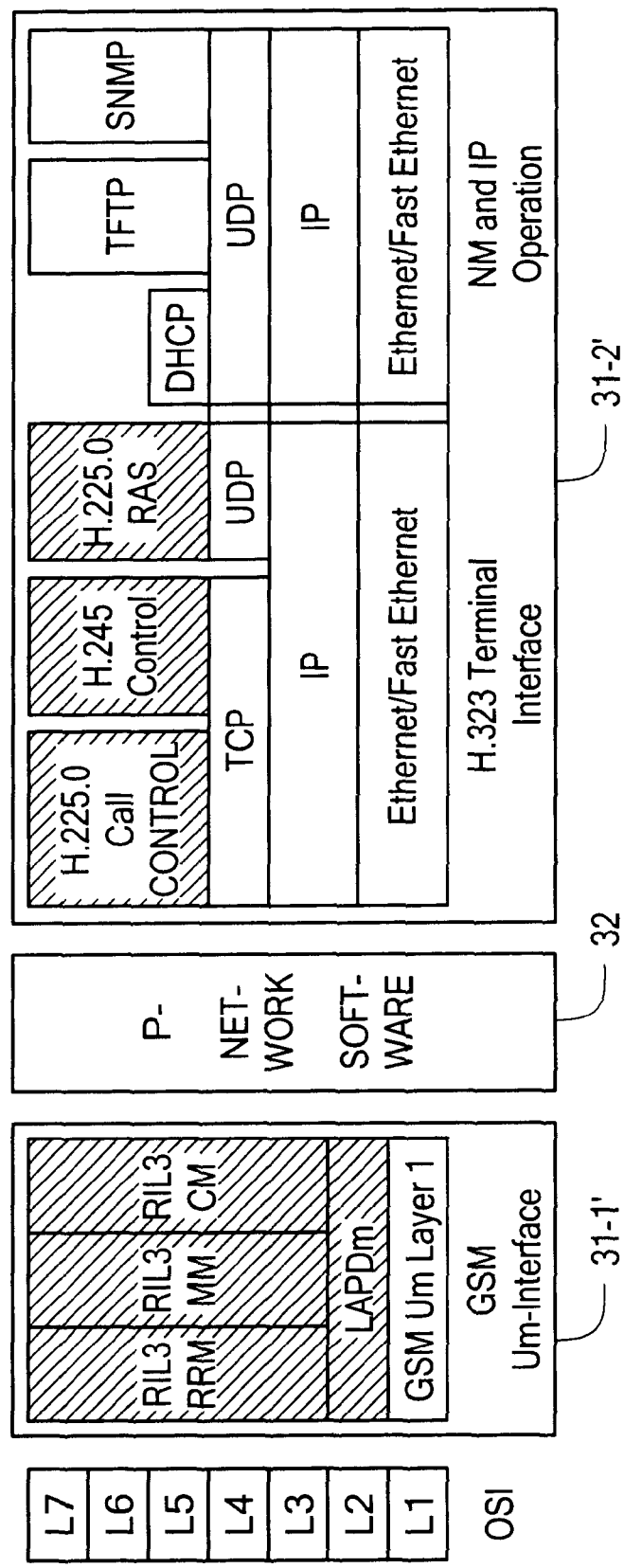
FIG. 5 depicts primary interface protocol stacks for IP-based private wireless base stations (P-BTS).

Protocol Stacks for Signaling—FIG. 5

To support the architecture, a standard GSM/TDMA stack 31 including the GSM Um-Interface component 31-1' and the H.323 Terminal Interface and NM and IP Operation components 31-2' is modified by the P-Network Software 32. In FIG. 5, the LAN based P-BTS 27 provides the following functionality: Interworking between the two Call Control Functions—private wireless and LAN based Private Wireless Mobility Management The Call Processing Plane Software Modules are significantly more complicated than those found in a normal public BTS and are defined in FIG. 6.

In a GSM example, the FIG. 1 public wireless network 15 includes conventional GSM basestation software including the components analogous to components 31-1' and 31-2'. The software including the components 31-1' and 31-2' do not provide support for call control or connection to the private wired internet protocol (Internet Protocol) that is used, in certain embodiments, in the private networks 14 of FIG. 1 and FIG. 2. Accordingly, the software components 31-1' and 31-2' require an IP protocol interface to facilitate interoperation of the wireless protocol and the wired packet protocol. For convenience, the IP protocol interfaces 28-1, . . . , 28-P are located with the P-BTSs 27-1, . . . ,27-P in the private wireless network 14 of FIG. 2. The present invention can be employed for public wireless networks 15 of FIG. 1, for private wireless networks 14 of FIG. 1 and FIG. 2 and the private wireless networks may or may not include the ability to communicate with private wired networks 24. The P-Network Software 32 is configured to provide the services required for any particular configuration.

In one configuration, each P-BTS 27 contains the required protocol stacks to perform the functions of the wireless control signaling from the mobile station 4 and the H.323 Endpoint, gatekeeper or gateway. In this embodiment, the H.323 Endpoint can be a PC based terminal 21 (see FIG. 2) or another mobile station 4. The gatekeeper provides the functions necessary to control the "terminals" within the H.323 domain and, in this embodiment, "terminals" include GSM mobile stations 4.

The H.323 gatekeeper provides the functions required to register the mobile stations 4 (equivalent to Location Updating), permit access to the network, translation of called numbers and routing of calls, if required. These functions are largely equivalent to those normally found in the MSC 17 or HLR 19 (see FIG. 1) of a public wireless network 15. The gatekeeper functions only need to exist in one P-BTS of the P-BTS 27-1, . . . , P-BTS 27-P within the H.323 zone. In the FIG. 4 example, P-BTS 27-3 provides the gatekeeper function within the H.323 zone of FIG. 4 and supports the operation of P-BTS 27-2 and P-BTS 27-1.

In order to support the full range of wireless functions, the functions of a standard H.323gatekeeper are augmented. The design includes the addition of a Local User Database (LUDB) 6—6 (See FIG. 6) to control the mobile station and provide Supplementary Services (SS) functionality. The gatekeeper database contents are transferred to the serving P-BTS when the mobile station 4 registers (that is, Location Updating has taken place) on a P-BTS. For example, if a mobile station 4 has registered on P-BTS 27-1 in FIG. 4 and the user data of mobile station 4 is stored with the gatekeeper 41 supported by P-BTS 27-3, then the relevant contents of the user database in P-BTS 27-3 are transferred to P-BTS 27-1 when the registration takes place. Any updates or alterations to the data by interaction of mobile station 4 are reflected back to the main gatekeeper database 7-3 stored in the gatekeeper 41 (See FIG. 7). This approach reduces the amount of call control signaling that is required within a LAN interconnection of P-BTS 27-1, . . . , 27-P and provides redundancy for increased reliability.

In order to provide external PSTN or public wireless network interconnection, an H.323 gateway 42 is provided. The gateway 42 is part of the normal LAN-PSTN operation. The gateway 42 provides line interface and transcoding functions that allow the voice and data traffic to be sent to existing networks (for example, PSTN, ISDN, B-ISDN, PBX).

An additional function required of a P-BTS 27 when used in a LAN environment is the ability to control the handover of mobile stations 4 between different P-BTSs 27 as mobile stations 4 move around within the LAN zone serviced by the private networks 14 of FIG. 2, FIG. 3 and FIG. 4. The handover decision is made internally within each P-BTS 27, only the signaling necessary to command a handover needs to go between different ones of the P-BTSs 27.

Figure 6:
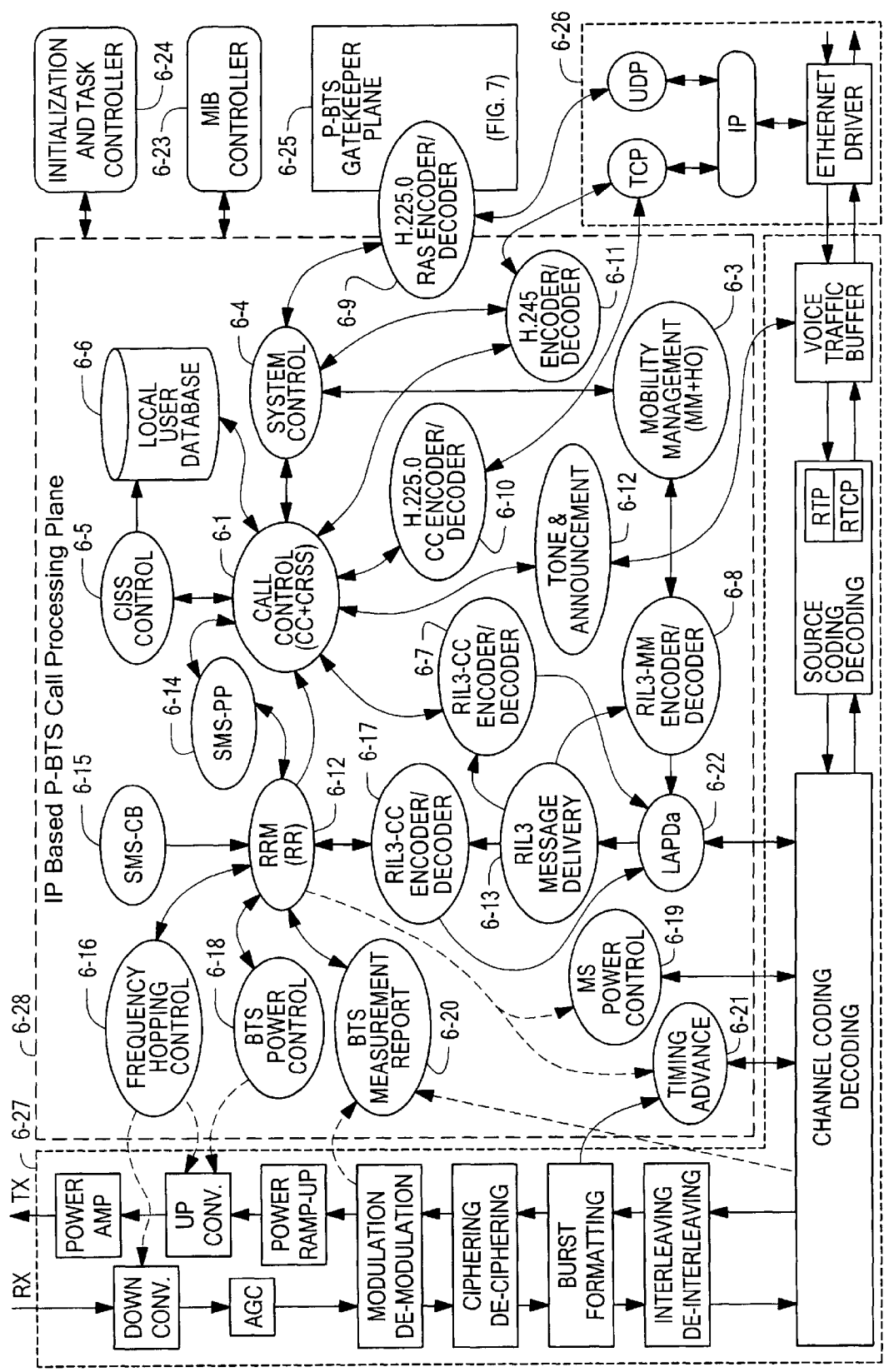
FIG. 6 depicts a call processing plane of software modules for IP-Based private wireless base stations (P-BTS).

Call Processing Plane Software Modules for IP-Based P-BTS-FIG. 6.

In FIG. 6, the software modules for the call processing plane include modules used for IP-based operation of P-BTSs 27 as follows:

Call Control Module—The module 6-1 is responsible for the "call feature control" function for the mobile station, including both basic Call Control (CC) as well as Call Related Supplementary Services (CRSS). The CRSS handled by this module include:
Calling Line Identification Presentation (CLIP)
Calling Line Identification Restriction (CLIR)
Connected Line Identification Presentation (COLP)
Connected Line Identification Restriction (COLR)
Call Forwarding Busy (CFB)
Call Forwarding No Reply (CFNR)
Call Forwarding Unconditional (CFU)
Call Waiting (CW)
Call Hold (HOLD)
Multi-Party Service (MPTY)
The Call Control Module is not merely an "interworking between the private Wireless Call Control and ISDN Call Control messages." It is required to carry out the feature control functions, such as connecting voice path, providing tones and announcements when call is not answered, working with Private gatekeeper entity in the local zone to obtain appropriate resource (e.g. conference circuit), forwarding a call, and managing call waiting and call hold features.

Tone and Announcement Module—The module 6-2 handles the actual generation of the various tone and announcement used according to the Call Control based on different call handling situation. Tone and Announcement are usually played towards the "far-end" this will be the LAN direction in this case, where only a tone is played toward the local Mobile Direction.

Mobility Management Module—The module 6-3 is responsible for handling the Mobility Management Function of the mobile station, including location update and handover control/co-ordination. This function was originally located in the private wireless MSC and is fulfilled in the 11P-based P-BTS. It also provides the ability to find a terminating mobile station and the ability to handle the call when the mobile station moves from one P-BTS to another P-BTS.

System Control Module—The module 6-4 is responsible for the End-Point registration, Administration, and status reporting in LAN. This entity is the "end-point" function and does not cover the gatekeeper functions which may be resident on the same P-BTS as well.

CISS Controller Module—The module 6-5 controls all the Call Independent Supplementary Services (CISS) for the mobile station that is registering through or served by the current P-BTS. The services include:
Subscriber activation/deactivation of various supplementary features, such as call waiting, call hold, call forwarding, etc.
Subscriber programming of the supplementary Service, such as the forwarded-to number when the mobile station is busy.
Most of the CISS features are of the interrogation type with the subscriber setting information in the domain user database. This module is responsible for updating the local user database(LUDB), while the LUDB is responsible for ensuring the changes are carried back to the domain user database (an
HLR like database in the gatekeeper) correctly.

Local User Database Module (LUDB)—The module 6-6 maintains a copy of user data for each of the mobile stations that is registered on the current P-BTS. The data is stored in local memory as a "cache." Any changes to the local copy will be "written-back" to the domain user database automatically. All the other modules who need the user data to operate interact with the Local User Database module for the data interrogation. The Local User Database Module will interact with the Domain User Database Module when necessary and does it in a way that is transparent to all the other modules in the P-BTS.

RIL3-CC Encoder/Decoder Module—The module 6-7 is responsible for encoding and decoding the GSM/TDMA Radio Interface Layer3 Call Control messages.

RIL3-MM Encoder/Decoder Module—The module 6-8 is responsible for encoding and decoding the GSM/TDMA Radio Interface Layer3 Mobility Management messages.

H.225.0 RAS Encoder/Decoder Module—The module 6-9 is responsible for encoding and decoding the H.225.0 Registration Administration and Status (RAS) messages. This module is shared between Call Processing Plane and the gatekeeper Plane.

H.225.0 CC Encoder/Decoder Module—The module 6-10 is responsible for encoding and decoding the H.225.0 Call Control messages. The H.225.0 Call Control Message is based on ISDN Q.931 Message Set.

H.245 Encoder/Decoder Module—The module 6-11 is responsible for encoding and decoding the H.245 messages. The H.245 specification defines a set of messages for controlling the allocation and management of the logical channels for multimedia applications.

RRM Module—The module 6-12 is responsible for the entire Radio Resource Management functionality that is normally split between the BTS and the BSC in the traditional architecture. The RRM Module will directly interface with the Call Control Module for radio resource functions, such as channel set-up, paging, etc.

RIL3 Message Delivery Module—The module 6-13 is responsible for looking into the protocol discriminator field in the layer-3 message header to determine which module has to process this message. The delivery of the CC message will now be sent to the RIL3-CC Encoder/Decoder Module, and the MM message to the RIL3-MM Encoder/Decoder Module.

SMS-PP Controller Module—The module 6-14 is responsible in handling the Point-to-Point SMS messages that are to be delivered to the target mobile station.

SMS-CB Controller Module—The SMS-CB module 6-15 is used to keep track of the functionality of receiving and distributing the SMS CB messages that are to be broadcast by all or part of the P-BTSs within the current H.323 Zone.

Frequency Hopping Control Module—The module 6-16 controls the frequency of communications for the target mobile station.

RIL3-RR Encoder/Decoder Module—The module 6-17 decodes and encodes the RIL3-RR messages to and from the BTS internal RR message formats. The formats of the REL3-RR messages are specified in the GSM Technical Specification 04.08 along with the RIL3-MM, RIL3-CC, RIL3-SS, and REL3-SMS messages specifications. This module provides the encoding and decoding of the RIL3-RR message which is required for the P-BTS.

BTS Power Control Module—The module 6-18 is responsible for providing the P-BTS power control (down-link) both statically and dynamically. The P-BTS Power Control Module takes the Mobile Uplink Measurement Data that is sent from a mobile, that is in dedicated mode, and compiled to provide the best power adjustment strategy for the given mobile. The goal is to maintain the P-BTS power in the optimal level so that the signal strength and signal quality for the down-link signal is within the private wireless quality guideline without causing excessive interference to the adjacent cell sites that are using the same or adjacent frequencies.

MS Power Control Module—The module 6-19 interfaces with the Channel Encoding and Decoding to add/retrieve the power control information into/out-off the header fields of the Layer 1 messages. The retrieval of the Mobile's up-link power level and the encoding of the command to instruct Mobile Station to increase/decrease the output power should be separated from the intelligence of performing a sliding window algorithm over a Mobile's power level and making the decision to increase or decrease the MS power level.

BTS Measurement Report Module—The module 6-20 interfaces with GSM/TDMA burst processing components to obtain the P-BTS measurement of the Mobile uplink signal. Specifically, the Automatic Gain Control and Demodulator for uplink power-level, and the Channel decoding unit for signal quality. Depending on the actual hardware architecture the input may come from more than just the three components identified above.

Timing Advance Module—The module 6-21 interfaces with the Burst Format function and retrieves the burst delay information for the Mobile, and then interfaces with the Channel Encoding and Decoding to add the Mobile timing advance information into the layer-1 header field. The Timing Advance Module can be treated as part of the Traffic Channel Processing Domain or as part of the Call Processing Domain. It autonomously monitors the delay of the arriving burst and instructs the burst formatting function to encode the amount of timing-advance that the mobile station needs to do in order to let the burst arrive within the burst envelope that the BTS is expected.

LAPDm Module—The module 6-22 interfaces the message delivery to the channel coding/decoding.

Figure 7:
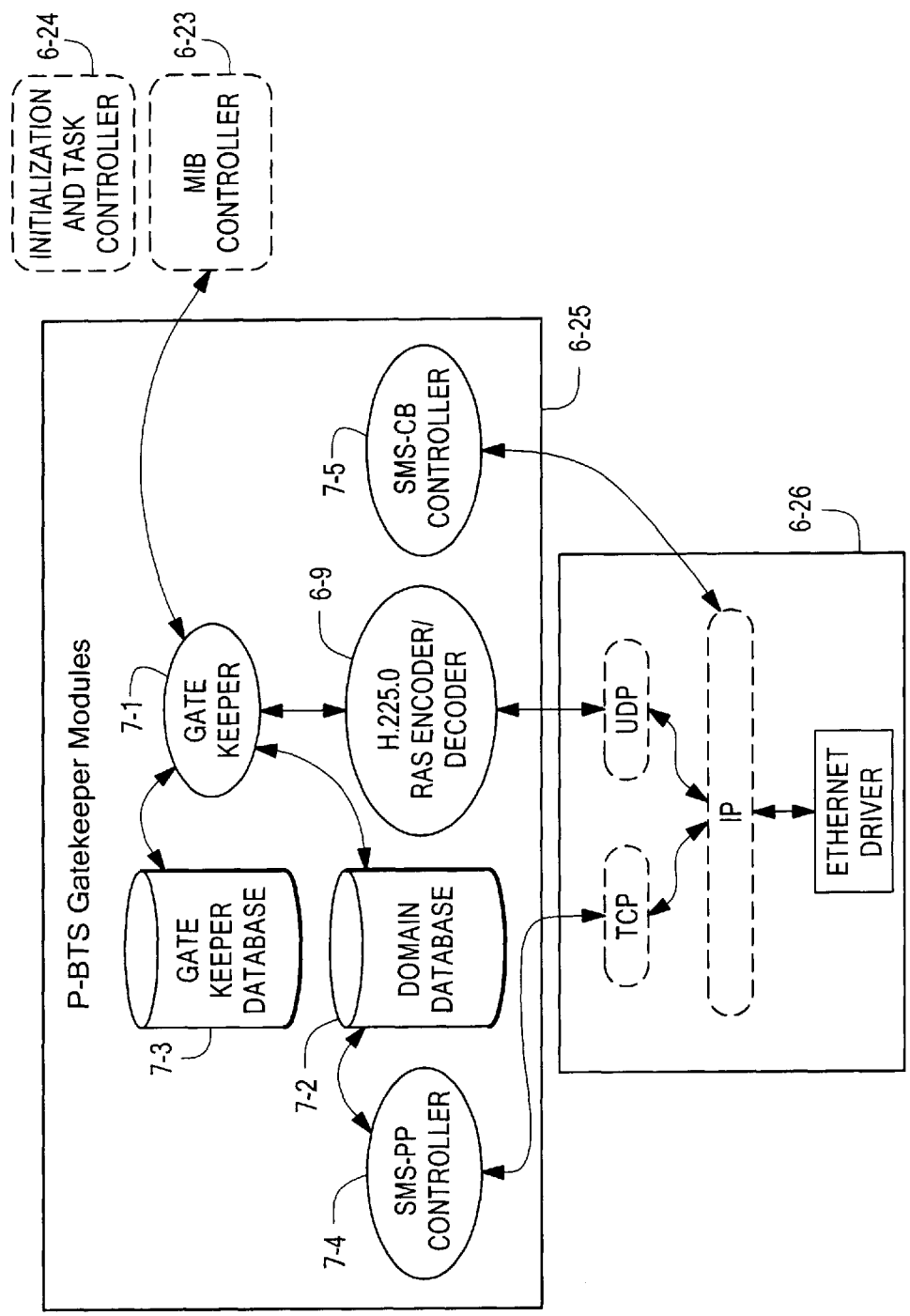
FIG. 7 depicts an IP-based private wireless base station (P-BTS) gate keeper plane of software modules.

IP-based P-BTS Gate Keeper Plane Software Modules—FIG. 7

In FIG. 7, the gatekeeper plane for gatekeeper 41 of FIG. 4 contains the modules which realize the wireless gatekeeper functionality as well as a combined Local/Domain User Database. Only one P-BTS 27 within each zone normally will have this plane activated. It is also possible to have the gatekeeper 41 run in a dedicated mode without sharing the responsibility of a P-BTS function. Therefore, logical separation is maintained between the two entities even though they are expected to co-exist in the same hardware platform for many deployment scenarios. The IP-based P-BTS Gate Keeper Plane Software Modules include:

Gatekeeper Module—The module 7-1 is responsible for the gatekeeper functionality as stated in the H.323 Specification. In one embodiment, the P-BTS may contain a gatekeeper entity along with an End-Point entity. Even though the gatekeeper is almost always consulted by the Call Control and System Control entities in the end-point, the above diagram does NOT show a direct connection among them. If all the entities are co-located in the same P-BTS, the traffic will actually go all the way to the IP layer, through the IP loop-back driver, and back to the correct entity.

Domain User Database Module—The module 7-2 maintains the Mobile User's database for the "Home Zone." It is similar to the functionality provided by the GSM/TDMA/CDMA HLR, but without using GSM/TDMA/CDMA MAP for accessing the content of the database from the GSM/TDMA/CDMA MSC. The Domain User Database (DUDB) is responsible for communicating with the Local User Database Module (LUDB) to provide a "cached copy" of the user data when the mobile station performs a location update through the serving P-BTS. The Domain User Database Module will be responsible for informing the Local User Database Module about the changes to the user data when that happens. These include the delivery of Point-to-Point Short Messages to the mobile station, the update from the network operator in changing the subscription information of the mobile user, and Mobile User performs another location update. Changes can be triggered in reverse direction from the Local User Database to the Domain User Database, such as Mobile User performs a Call Independent Supplementary Service to program its supplementary services. In all cases, the Domain User Database Module in the Gate Keeper only interacts with the User Local Database Module in the P-BTS and not the various Call Control or CISS Modules directly.

Gate Keeper Database Module—The module 7-3 maintains the gatekeeper's database regarding all the mobile stations in the same zone as well as information regarding other gatekeepers in the connected network.

SMS-PP Controller Module—The module 7-4 is responsible in handling the Point-to-Point SMS messages that are to be delivered to the target mobile station. The module 7-4 is the same as the module 6-14 in the Call Processing Plane of FIG. 6.

SMS-CB Controller Module—The SMS-CB module 7-5 is used to keep track of the functionality of receiving and distributing the SMS CB messages that are to be broadcast by all or part of the P-BTSs within the current H.323 Zone. The module 7-5 is the same as the module 6-15 in the Call Processing Plane of FIG. 6.

H.225.0 RAS Encoder/Decoder Module—The module 7-6 is the same as the module 6-9 as described in the Call Processing Plane of FIG. 6.

Figure 8:
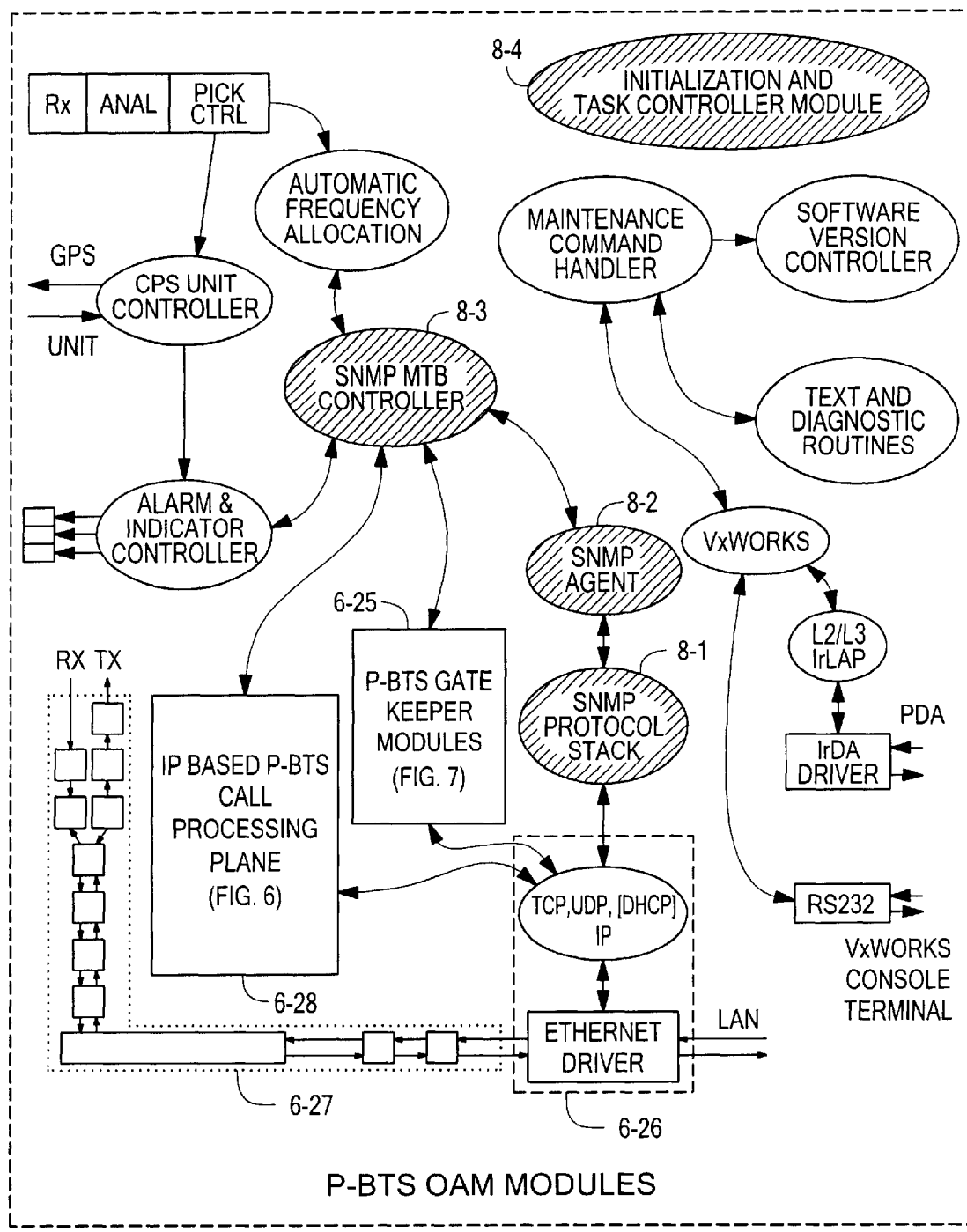
FIG. 8 depicts IP-Based private wireless P-BTS OAM Software Modules.

IP-Based P-BTS OAM Software Modules—FIG. 8

The OAM Software Modules for the IP-Based P-BTS uses an SNMP based Management Information Base (MIB). The new modules beyond those found in a normal public BTS are as follows:

SNMP Protocol Stack Module—The module 8-1 is the SNMP protocol stack as used to control the SNMP NWB SNMP Agent—The module 8-2 provides the agent side code to perform the action request from the SNMP manager via the SNMP protocol.

SNMP MW Controller Module—The module 8-3 is responsible for maintaining the SNMP MIB (a logical view, from maintenance perspective, for all the resources) for the P-BTS. The remote OAM commands from, for example an OMC-R are all carried out via changes to the MIB. The MIB controller than interprets the changes and performs the maintenance actions. Alarm and Performance reports from the P-BTS will also be collected and stored in the MEB. This module handles all the SNMP MIB, including additional configuration and controlling attributes for the H.323 aspects of the P-BTS. Furthermore, the CC and NM functionality and RR functionality is also managed by this module.

Initialization and Task Control Module—The module 8-4 is responsible for handling the initialization of all the other Software Modules, establishing communication, and monitoring the health of all these processes through heart-beat (keep-alive timer) mechanisms.

Figure 9:
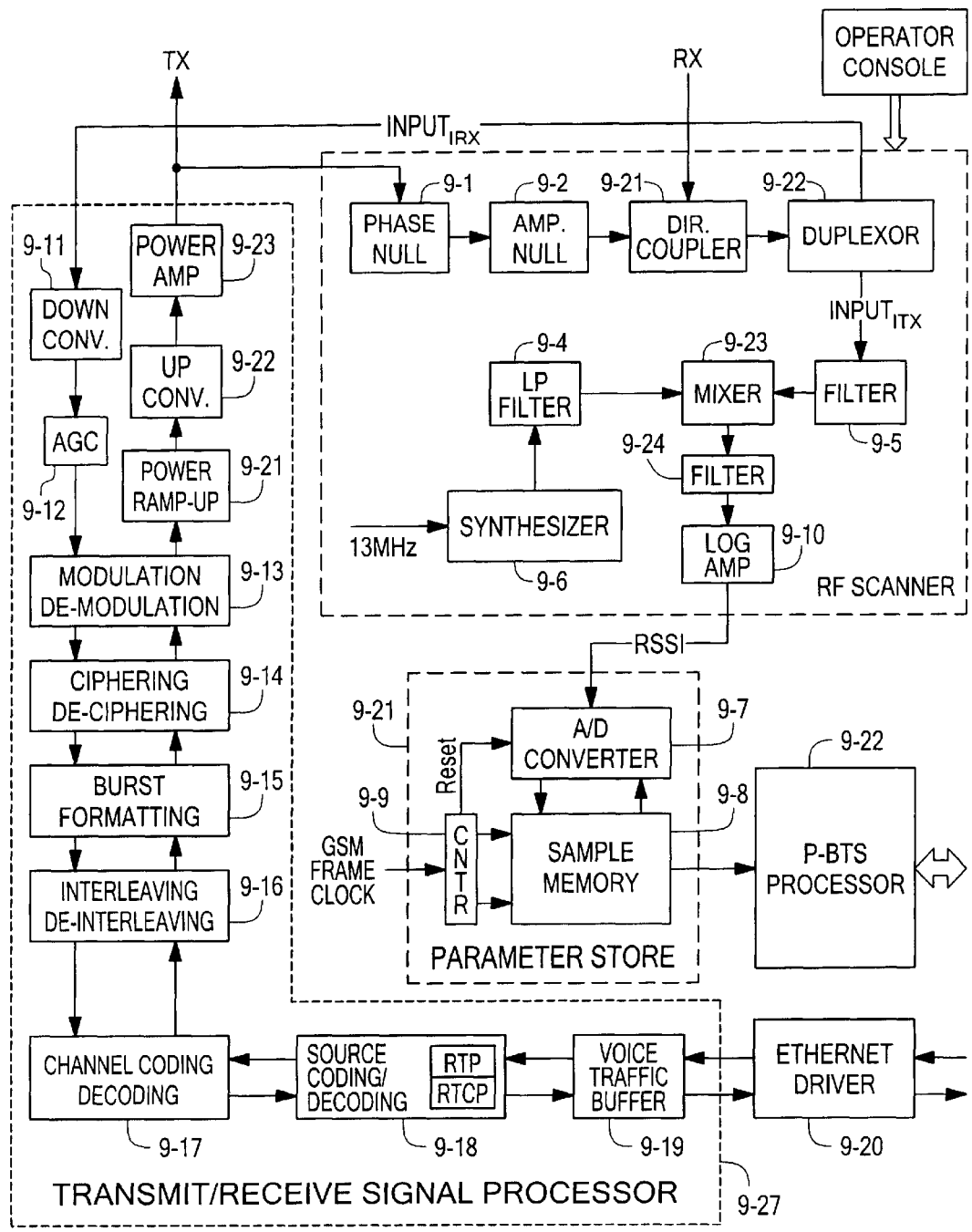
FIG. 9 depicts a block diagram representation of a transmit/receive signal processor and a radio frequency scanner employed in the private wireless base stations (P-BTS).

Signal Processor and Radio Frequency Scanner—FIG. 9.

FIG. 9 depicts a block diagram representation of a transmit/receive signal processor 6-27, a radio frequency scanner 9-0, a parameter store 9-21 and a P-BTS processor 9-22 employed in the private wireless base stations (P-BTS) 27 of FIG. 2, FIG. 3 and FIG. 4.

The transmit/receive signal processor 6-27 for each particular P-BTS 27 includes a down converter 9-11 for down converting the received signals (RX) from users 4. The down converted signal from down converter 9-11 is connected to an automatic gain control (AGC) for normal processing.

The transmit/receive signal processor 6-27 for each particular P-BTS 27 additionally includes for normal processing a modulation/demodulation unit 9-13, a ciphering/deciphering unit 9-14, a burst formatting unit 9-15, an interleaving/de-interleaving unit 9-16, a channel coding/decoding unit 9-17, a source coding/decoding unit 9-18 and a voice traffic buffer 9-19. The voice traffic buffer 9-19 connects to an ethernet driver 9-20. The transmit/receive signal processor 6-27 additional includes on the transmit path, the modulation/demodulation unit 9-13, a power ramp-up unit 9-21, an up converter 9-22 and a power amplifier 9-23 which outputs the transmitted signal (TX).

The radio frequency scanner 9-0 receives both the signal (RX) from the receive antennas and the signal (TX) from the transmitter output of the signal processor 6-27. The transmitter output (TX) is fed to the phase null circuit 9-1 and amplitude null circuit 9-2 to prevent feedback from the transmitter into the frequency scanner 9-0 which is set to receive in the transmit band. A directional coupler 9-21 feeds the nulled transmit signal and the received signal (RX) into a bandpass duplexer 9-22. The duplexer 9-22 provides the signal to the receiver at the receive band frequency ($INPUT_{fRX}$) and to the frequency scanner 9-0 at the transmit band frequency ($INPUT_{fTX}$). The signal towards the frequency scanner is then further filtered and amplified in active filter 9-5 before being fed into mixer 9-23. The mixing frequency into the mixer 9-23 is set by the synthesizer 9-6 and is low pass filter in filter 94. The synthesizer 9-6 selects the RF frequency to be measured. The output of the mixer 9-23 at the IF frequency is filtered in filter 9-24 and then is fed into a logarithmic amplifier 9-10. The output of the log amplifier 9-10 is a direct measure of the received signal strength. The detected signal is converted in A/D converter 9-7 and the converted values are stored in sample memory 9-8. The values in sample memory 9-8 represent the signals that are detected in the region 211 and their relative strengths. These signals are made available to the initialization task controller module 8-4 in FIG. 8 for use in initialization and configuring the P-BTS. In operation, the radio frequency scanner 9-11 provides continuous scanning of the bands of interest to detect active P-BTSs 27. For a GSM example, scanner 9-11 scans the 900 Mhz, 1800 MHz or 1900 Mhz bands. For a GSM BCCH, the RF carrier is transmitted at constant power. The A/D converter 9-7 is calibrated, in one example, to provide an Absolute Received Signal Strength Indication (ARSSI) and in another example provides a Relative Received Signal Strength Indication (RRSSI) between carriers. Using the type of RSSI selected, the frequency to use for the P-BTS is determined.

In an alternate embodiment, a demodulator circuit is used in the scanner to receive the actual bits transmitted by each monitored P-BTS of interest. These actual bits are then used to accurately identify the P-BTS and this information is communicated back to the OAM system of FIG. 8 for verification of performance and other use.

Operation

Network Operations

The Intranet-based and/or public cellular networks P-BTS, 27 using the modules described above and deployed in cells 411-1, . . . , 411-20 for a private region 211 as shown in FIG. 4 provides the same type of services that are normally provided by a public system in public region 111 that is based upon the conventional GSM architecture as represented by the public wireless network 15 in FIG. 1.

Installation procedures for installing BTSs in a public region 111 of FIG. 1 or a private region 211 of FIG. 3 typically include a number of steps and can support a number of different modes of operation. The steps required for a public region 111 and a private region 211 are essentially the same. The following steps are typical for an indoor installation for a private region 211:

Mounting. The installation technician mounts each radio P-BTS at a location within a building that has access to an electrical power source and a network (LAN) connection.

Network Connection. The technician connects the LAN interface of the P-BTS to the network connection.

Electrical Connection. The technician plugs the power supply of the P-BTS into the electrical power source.

Radio Bringup. As soon as the P-BTS powers on, it will perform automated hardware diagnostics and upon successful conclusion, the technician will be alerted through an indication, for example, from an LED interface on the P-BTS or via a portable craft interface connected to the P-BTS.

P-BTS Self-Test. The P-BTS conducts an automated self-test and loads the standard network frequency parameters from either the network management system or from an adjacent P-BTS.

Frequency Selection. The P-BTS tests and prioritizes the best performing available frequencies for itself Then, the P-BTS selects (or recommends to the network management system) a frequency for operation. Then, the P-BTS automatically begins operation on the selected frequency (or waits for the network management system to authorize a frequency).

P-BTS Self-Optimization. The P-BTS will self-optimize over time and/or can make recommendations to the network management system.

Ongoing Self-Tests. The P-BTS continually tests all available frequencies storing the results and/or returning the results to the network management system. This operation permits the entire network to undergo a "synchronized reset" for all P-BTSs in order to optimize frequency allocation.

Frequency Re-Allocation and Negotiation. Frequency re-allocation and negotiation is managed by distributed algorithms in each P-BTS (or centrally by the network management system). In some modes of operation, P-BTSs are not permitted to make changes dynamically without authorization from the network management system.

Radio History. A frequency and power history for each P-BTS is stored and is forwarded to the network management system for use and analysis.

Radio Frequency Output To Planning Tool. When frequency planning tool is available, the network management system can export P-BTS frequency history reports and other information in a format acceptable to such tools (for example, MSI PLANET, LLC's and Tornado).

The P-BTS setup operations can be automated so as to eliminate or minimize the use of planning tools since such tools have been found to be problematic and inefficient. With such automatic operation, the setup potentially operates a number of different modes. Setup control can be maintained by the network management system (Operator Control) or by a local technician (Local Craft Control) or can be automatic by operation of the P-BTS alone (Autonomous). Depending on the mode of operation, different communications occur under control of the Operations, Administration and Maintenance (OAM) Center in order to upload the radio plan to the network management system or to download a radio plan to the P-BTS. These communications are typically made for system optimization and are not necessarily part of the P-BTS system setup.

Operational Modes—FIG. 10

FIG. 10 depicts a flow diagram of the sequencing to select operational modes for a typical P-BTS setup. The P-BTS system consists of two parts, a radio based hardware component as shown in FIG. 9 and software based component as described in connection with FIGS. 12 through 15. In order to avoid network conflicts and instability in the radio network planning, the P-BTS setup algorithms are controlled as to mode depending upon the deployment strategy (that is, public or private), the type of BTS (that is, macro, micro or pico), the control center (that is, central, local or autonomous). The type of control is dependent upon the requirements of the network operator. The P-BTS automatic parameter assignment algorithms are preferable but they can be disabled if conventional methods of cell planning are to be used to deploy P-BTSs in the system.

In FIG. 10, the setup starts by determining in Use APA if automatic parameter assignment (APA) is to be employed. If NO, the control moves to Manual Mode and some other method of cell planning and set up is used. If YES, the Operator Control? determination is made to ascertain whether an external operator will control the frequency assignment setup. If YES, then set the frequency. If NO, the Local Craft Control? determination is made to ascertain whether a local craft operation will control the frequency assignment setup. If YES, the control proceeds to 5 (see FIG. 11). If NO, the Autonomous? determination is made to ascertain whether autonomous operation will control the setup. If YES, the control proceeds to 4 (see FIG. 12). If NO, the Manual Mode is entered for manual control and selection of other functions not described.

Operator or Local Craft Operation Mode of a Frequency Selection—FIG. 11.

FIG. 11 depicts a flow diagram of the Local Craft operation mode of a frequency selection algorithm implemented using the frequency detection capabilities of the scanner 9-11 of FIG. 9. The system is operated by a craft person located so as to be able to control a local P-BTS to step through the frequency range in order to determine the optimum frequency. The frequency determined is then set as the operational frequency of the P-BTS. In operation, the craft person manually controls the scanner 9-11 of FIG. 9 by setting the tunable mixer 9-5 to a particular frequency, SET FREQ n, and then observes the RSSI value determined in Measure RSSI, operation of the scanner 9-5. If YES is the result of the SUITABLE FREQ? determination, the frequency is set by the SET FREQ n operation and if NO is the result then the SET FREQ n step is again repeated until a suitable frequency is found. After the SET FREQ n operation, the process ends at END.

Autonomous Operation—FIG. 12.

FIG. 12 depicts a flow diagram of the phases of autonomous frequency assignment operation entered from 4 in FIG. 10. The frequency assignment operation includes three phases, namely, Installation Phase 1, Operational Phase 2 and Maintenance Phase 3. The frequency assignment operation proceeds from Installation Phase 1 to Operational Phase 2 and from Operational Phase 2 to Maintenance Phase 3 and back and forth thereafter between Operational Phase 2 and Maintenance Phase 3.

Figure 13:
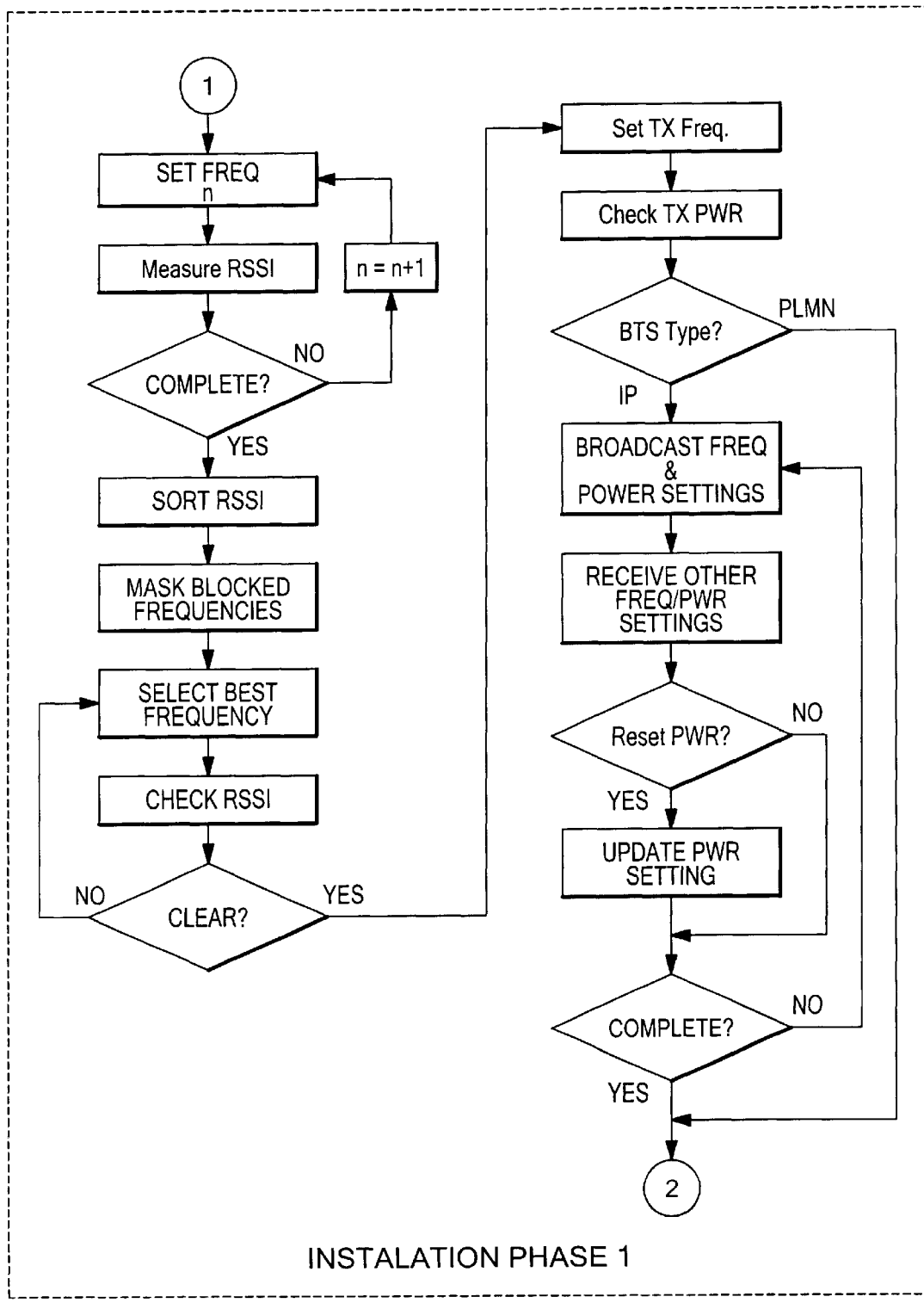
FIG. 13 depicts a flow diagram of the installation phase.

Installation Phase—FIG. 13.

FIG. 13 depicts a flow diagram of the Installation Phase 1. The installation phase is the first phase of the P-BTS autonomous frequency assignment algorithm and ultimately determines the quality of the overall frequency plan and the final reuse pattern. It is possible to use a 1×1 reuse pattern in a building with high attenuation between each P-BTS.

The first part of the process is to scan the transmit frequency band to build a representation of the frequencies that are available and the power levels being used by the other BTSs.

In operation, the scanner 9-11 of FIG. 9 sets the synthesizer 9-6 to a particular frequency, SET FREQ n, and then the RSSI table determined in MEASURE RSSI operation of the scanner 9-5 and stores the RSSI value in an RSSI table. If YES is the result of the COMPLETE? determination, the RSSI are sorted in the SORT RSSI operation. The RSSI table is sorted to rank the frequencies in order of availability. This initial ranking is stored and used to determine any changes in the network configuration. If NO is the result of the COMPLETE? determination, then the SET FREQ n and MEASURE RSSI operations are again repeated until all the suitable frequencies are found and stored in the RSSI table. After the SORT RSSI operation, the MASK BLOCKED FREQUENCIES operation occurs to eliminate any frequencies that are not permitted due to operational requirements (for example, in use by another operator or not allowed for Pico Cells).

At this point the P-BTS is ready to set the TX frequency to be used. It can also set the TX power, this could be a default value or based on the ARSSI values obtained in the initial scan process. The SELECT BEST FREQUENCY operation detects the best frequency from the not masked frequencies available from the RSSI store, checks the RSSI in the CHECK RSSI operation and if YES is the result of the CLEAR? determination, sets the transmit frequency by the Set TX Freq. operation. If NO is the result of the CLEAR? determination, the SELECT BEST FREQUENCY operation and the CHECK RSSI operations are repeated. After the Set TX Freq. operation, the transmission power of the new transmit frequency is set and checked in the Check TX. PWR operation.

At this point, the type of BTS is checked in the BTS Type? determination to determine if the BTS is public, PLMN, or private, IP. If private (P-BTS) and deployed with LAN interconnection to other P-BTS, the BTS typically broadcast over the LAN with the BROADCAST FREQ & POWER SETTINGS operation to other BTSs within its domain the frequency that the P-BTS is going to use. The other receiving BTSs connected by the LAN store this information along with the BTS's identity for future use. Other BTSs can then respond with the RECEIVE OTHER FREQ/PWR SETTINGS operation with reports on the performance of the newly installed BTS. This report includes the frequency set and power level received. Based upon this information the newly installed BTS can then reset its power level in the UPDATE PWR SETTING operation as a result of the Reset PWR? determination if YES or bypass the power update if NO. The COMPLETE? determination if NO causes the re-entry of the installation phase and repeat the whole process commencing at the BROADCAST FREQ & POWER SETTINGS operation. The COMPLETE? determination if YES causes the control to flow to the operational phase 2 of FIG. 14.

If the newly set TX frequency and power levels are acceptable, then the BTS proceeds to setup the neighbor cell information required for handover purposes. If the TX power from the BTS and the RSSI at the receiving BTS are known, it is possible to approximate the distance between the BTSs, provided the path is free space, and this distance information helps with handover performance. The neighbor cell information is calculated from the response to the TX Frequency and power request to surrounding BTSs. It is assumed that the BTSs that respond with a RSSI value for the newly installed BTS are potential handover candidates. Also based on the RSSI value received and the known TX power level, it is possible to set the handover power level thresholds for handover candidates (this value can be a simple subtraction of power levels). Similarly, the BTS receiving the broadcasts from the newly installed BTS can use the data to set up their new handover candidate lists, provided they can detect the new BTS, if they cannot detect the TX frequency then they will not set the BTS as a candidate handover BTS. They should retain the information in case the situation changes. When the newly installed BTS is in the operational phase, it may also receive transmissions from installing BTSs and must update the lists accordingly.

If the PLMN version of the BTS is being used, then the same information that is broadcast over an IP LAN for the private P_BTS is sent back to the OMC-R where it is relayed to all the other relevant BTSs for planning purposes. Alternatively, the OMC-R performs the algorithms found on the BTS and then relay the results to the other BTSs.

Operational Phase—FIG. 14.

FIG. 14 depicts a flow diagram of the operational phase. The Operational and Maintenance phases are continually run by the P-BTS when the P-BTS system is enabled. The process is similar to the installation process. In this case the system, as well as scanning for TX frequencies from other BTSs, takes the measurement reports provided by the user into account. As in most modern cellular systems, the user will report on the downlink performances of P-BTSs that the user can detect. This information is collated and sent to the serving P-BTS. The information provided by the Mobile handset is used to optimize the performance of the P-BTS. In this case it can be used to reset TX power values, detect "hidden" P-BTSs that are not directly visible and provide additional information on known P-BTSs. The "hidden" P-BTS is a particular problem when listening to direct transmissions, by using the user information, the P-BTS can detect possible conflicts which can therefore be resolved. This information is also provided in a post installation phase before going operational to optimize the network if required.

In FIG. 14, based upon the received user information in the RECEIVE USER DATA operation and the continually scanning receiver in the P-BTS a CALCULATE OTHER FREQ & POWER LEVELS operation is performed and based on this information the CALCULATE TX POWER LEVEL & C/I operation is performed. Based on this information, a RESET FREQ OR PWR? decision is made to decide whether to further optimize the TX power level for the BCCH or modify the TX frequency. If the RESET FREQ OR PWR? decision is YES, the CHANGE PWR OR TX FREQ task is performed and the Operational Phase 2 then flows to the Maintenance Phase 3. If the RESET FREQ OR PWR? decision is NO, the Operational Phase 2 flows directly to the Maintenance Phase 3. The modification of the TX power level for the BCCH or the TX frequency parameters can be restricted by the operator of the network. Furthermore, these parameters can be restricted so as not to be changed except when the number of users is small (for example, late at night). This process normally runs for an extended time such as over several hours, days or even months to collect sufficient information to perform an optimal power or frequency setting. By integrating the results over a long period of time, problems related to quick frequency changes and consequential network instabilities are avoided. This information is sent back to the main control center for co-ordination with other BTSs reporting information.

Maintenance Phase—FIG. 15.

FIG. 15 depicts a flow diagram of the maintenance phase of operation. In maintenance phase, the scanner 9-0 of FIG. 9 sets the synthesizer 9-6 to a particular frequency, SET FREQ n, and then measurers the RSSI in the MEASURE RSSI operation of the scanner 9-6 and stores the RSSI value in an RSSI table. If YES is the result of the COMPLETE? determination, the RSSI are sorted in the SORT RSSI operation. The RSSI table is sorted to rank the frequencies in order of availability. This initial ranking is stored and used to determine any changes in the network configuration. If NO is the result of the COMPLETE? determination, then the frequency is incremented in the n=n+1 step and the SET FREQ n and MEASURE RSSI operations are again repeated until all the suitable frequencies are found and stored in the RSSI table. After the SORT RSSI operation, the MASK BLOCKED FREQUENCIES operation occurs to eliminate any frequencies that are not permitted due to operational requirements (for example, in use by another operator or not allowed for cells in the region 211).

At this point, the P-BTS is ready to review the initial ranking and determine if any changes in the network configuration have occurred. Based upon any changes that have occurred, the RETUNE? decision is made and if NO, the processing remains in the Maintenance Phase 3 and returns to the SET FREQ n step and the maintenance phase processing is repeated. If the RETUNE? decision is YES, the processing returns to the Operational Phase 2 where conditions are examined to determine if a change in frequency or power is warranted for the particular base station.

Figure 16:
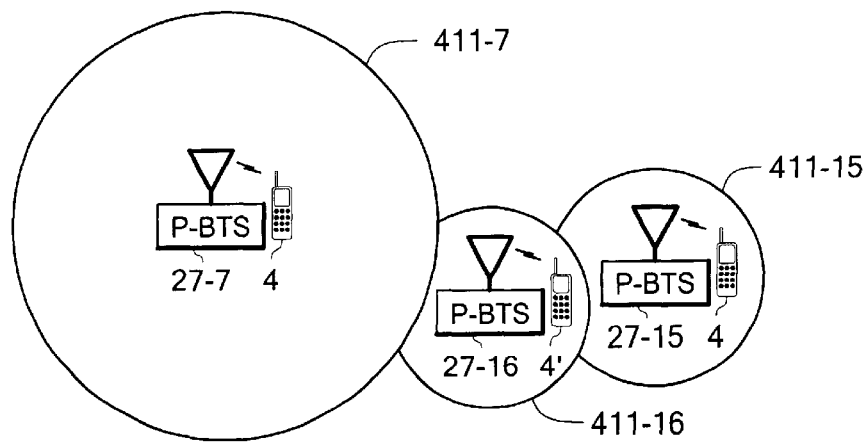
FIG. 16 depicts a representation of three cells from the private wireless region of FIG. 4.

Three Cell Example—FIG. 16

FIG. 16 depicts a representation of three fully operating cells 411-7, 411-15 and 411-16 from the private wireless region 211 of FIG. 4. Whenever a user 4 travels from cell 411-7 to cell 411-16, a handover occurs from P-BTS 27-7 to the P-BTS 27-16. Similarly, whenever a user 4 travels from cell 411-16 to cell 411-15, a handover occurs from P-BTS 27-16 to the P-BTS 27-15. The handovers involve a change in frequency in the well known manner of a GSM/TDMA system. The data relating to occurrences of handovers of users 4 traveling from cell to cell is stored as part of uplink measurement data. Each of the fully operating cells 411-7, 411-15 and 411-16 also stores size and location information for other cells (particularly neighbor cells) in region 211 of FIG. 4 and for none, one or more of the cells 11 (particularly neighbor cells) of public wireless network 15 of FIG. 1 as part of the handover neighbor information. Neighbor cells are cells that are in close proximity to each other such that their signals overlap and which are usually candidates for handover.

Figure 17:
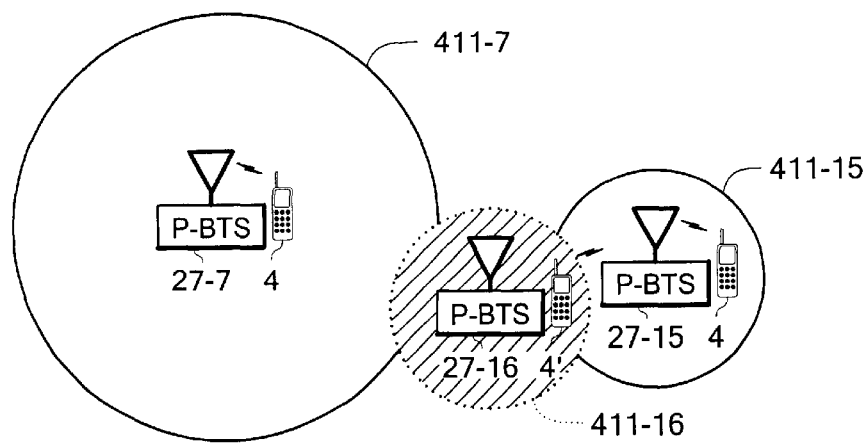
FIG. 17 depicts a representation of the remaining two cells when one of the three cells of FIG. 16 is off line.

Non-Working Cell In Three Cell Example—FIG. 17

FIG. 17 depicts a representation of three cells 411-7, 411-15 and 411-16 from the private wireless region 211 of FIG. 4 and FIG. 16 at a time when the cell 411-16 has become non-working. Whenever a user 4 is in the cell 411-16 area, the user cannot be supported by the non-working P-BTS 27-16 and a user traveling from cell 411-7 to cell 411-16, for example, cannot handover from P-BTS 27-7 to P-BTS 27-16. The result is that the cell 411-16 cell area is a radio hole in the cellular region 211 of FIG. 4 and FIG. 17.

Figure 18:
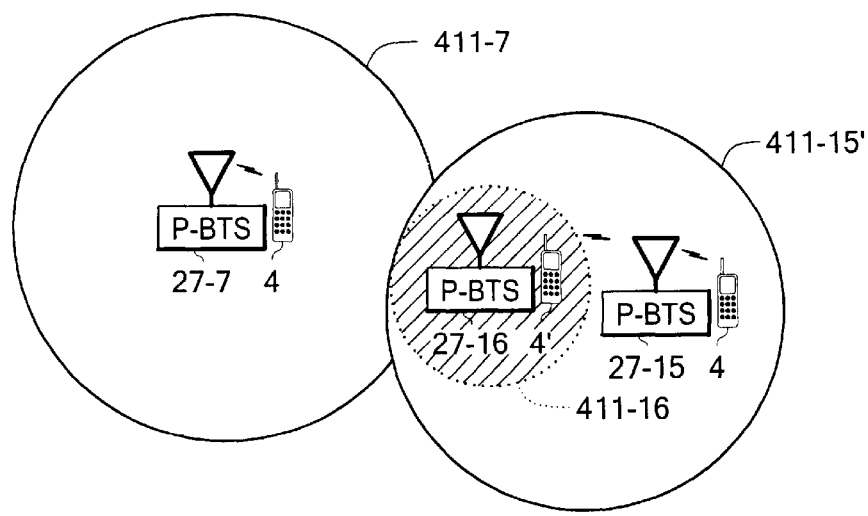
FIG. 18 depicts a representation of the remaining two cells when one of the two cells of FIG. 17 compensates for the off line cell.

Non-Working Cell With Adjacent Cell Compensation—FIG. 18

FIG. 18 depicts a representation where cell 411-15 of FIG. 17 compensates by enlarging to the cell 411-15' area so that it overlaps the radio hole represented by the area of the non-operational cell 411-16. The adaptation that permits the cell 411-15' to compensate for the radio hole of the non-operational cell 411-16 occurs in the Operational Phase 2 of FIG. 14 and the Maintenance Phase 3 of FIG. 15. The Maintenance Phase 3 for P-BTS 27-15 is entered after the loss of a P-BTS carrier for P-BTS 27-16 has been detected by P-BTS 27-15 in the Operation Phase 2. This loss of carrier may be detected by either or both P-BTS 27-7 or 27-15, for example. If a detecting P-BTS (27-7 or 27-15, for example) loses contact with a P-BTS (e.g. P-BTS 27-16), then the detecting P-BTS may alert other neighbor BTSs of the problem via a broadcast on the IP-LAN or to the OMC-R. If P-BTS 27-16 knows it can no longer provide radio coverage (e.g. RF failure, power failure), then it may send a broadcast message to other P-BTSs (including neighbor P-BTSs 27-7 and 27-15, for example) to indicate that P-BTS 27-16 has a problem.

When P-BTS 27-16 suddenly becomes non-operational, it is desirable that the network respond quickly to the change. A typical response is to ramp up the power of the P-BTS 27-15 to cover the radio hole created by P-BTS 27-16 becoming non-operational. A number of factors are considered in determining the amount that the power increases in a detecting P-BTS, such as typical P-BTS 27-15.

The operations of a typical P-BTS are explained with reference to P-BTS 27-15. P-BTS 27-15 is continuously monitoring the signal strength of users 4 as they move into the vacated area of non-working cell 411-16. The data for handovers of users 4 traveling from cell 411-15 into cell 411-16, prior to cell 411-16 becoming non-operational, is detected by tracing back in the stored uplink measurement data. Also, the size and location information for cell 411-16 is stored as part of the handover neighborhood information for P-BTS 27-15 of cell 411-15. Using the signal strength of the P-BTS 27-16 received at P-BTS 27-15 before P-BTS 27-16 became non-operational, a calculation is made, based on transmission models, of the TX power that should adequately cover the radio hole caused by P-BTS 27-16 going non-operational. Using this information, P-BTS 27-15 increases its power as indicated by the cell 411-15' boundary as shown in FIG. 18 to prevent the users 4 from losing coverage when the users 4 are in the area of non-operational cell 411-16 area.

Additionally, P-BTS 27-15 can request, via the LAN connection among all the P-BTSs, that other P-BTSs report on the received signal strength newly increased by P-BTS 27-15 to cover the radio hole caused by non-operational P-BTS 27-16.

Other P-BTSs in region 211 of FIG. 4, including P-BTS 27-7 in cell 411-7, also autonomously take action to ensure that the radio hole caused by the non-operation of P-BTS 27-16 is compensated by some one or more others of the available P-BTSs in the network 211. Based on the collective actions of all the P-BTS reporting over the LAN, each individual P-BTS can determine if the radio hole has been covered. In some cases, it may not be possible to cover radio holes adequately and limits are included in the algorithm to prevent excessive power from being transmitted by the P-BTSs. Excessive power from one P-BTS can saturate other P-BTSs in the vicinity. The dynamic reconfiguration requires balancing and tuning of the different P-BTS in order to approach optimum operation.

In the embodiment previously described, each of the P-BTS operates autonomously. As an alternative or refinement to the autonomous algorithm, a local master P-BTS is selected to coordinate other P-BTSs within a specified region. This local master takes a view of the whole network and not just an isolated P-BTS failure. If, for example, several neighbor P-BTSs have failed in a specific region, other corrective action may be needed if autonomous operation cannot fully compensate for the non-operability of multiple P-BTSs.

The opposite condition of a radio hole is created in the situation where a newly operational P-BTS suddenly appears in the region 211 of FIG. 4. In this situation, the presence of the new P-BTS must be detected so as to permit ramping down of power, change of the TX frequency or other corrective action for one or more of the P-BTSs. The process of reacting to a newly added P-BTS, in general, can be carried out over a longer period of time than the time taken to compensate for a sudden radio hole. The process of reacting to a newly added P-BTS will generally involve interaction by the neighboring P-BTSs with the new P-BTS to measure the received power levels from the new P-BTS at the neighboring P-BTSs. This process can be automated or can involve local control of the P-BTS by a craft person or by a remote operator. It should be noted that all the parameters associated with the algorithms can be set via OAM procedures and may be optimized for different conditions and environments.

Figure 19:
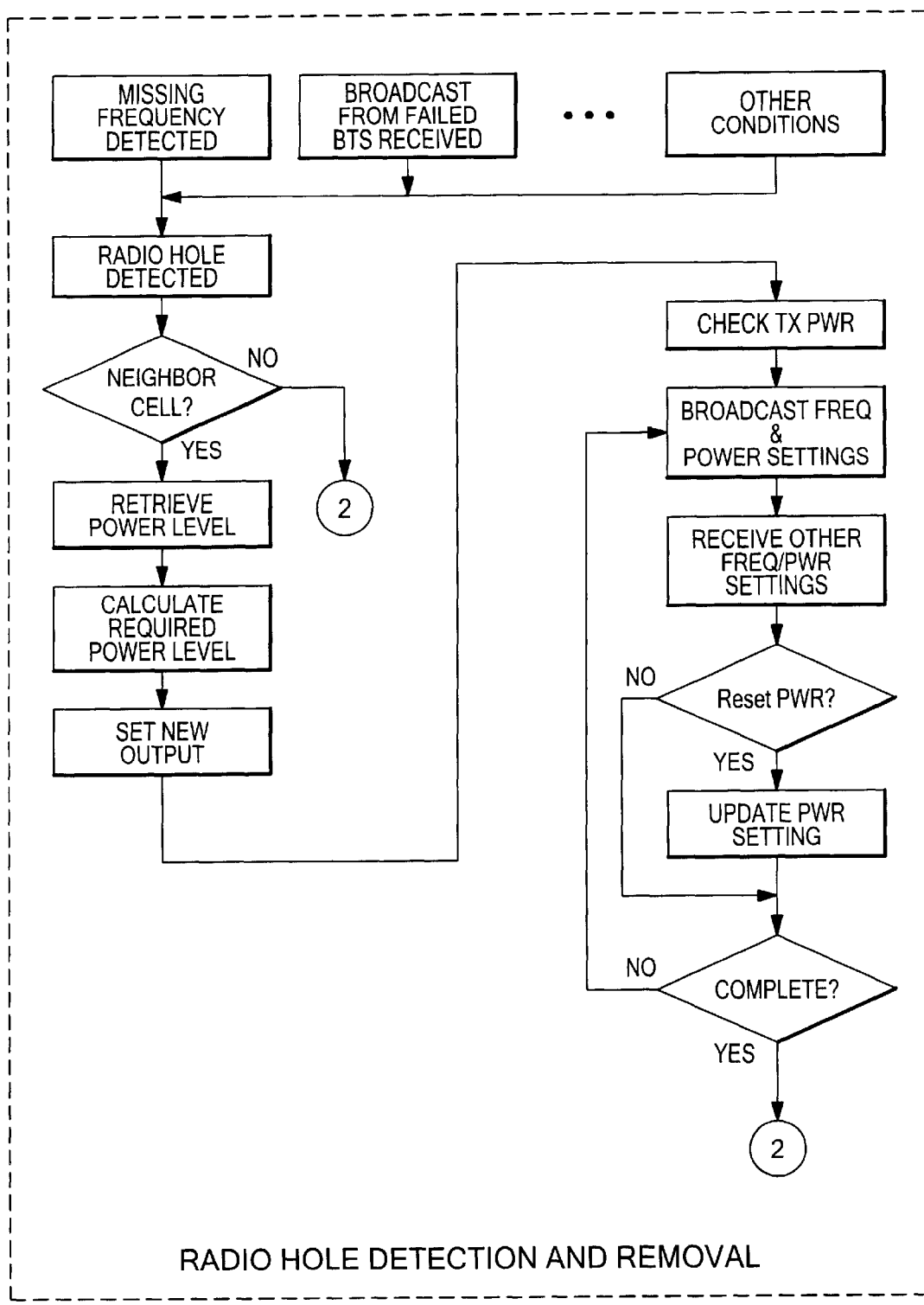
FIG. 19 depicts a flow diagram of the control algorithm for adjusting neighboring cells in to achieve the radio hole filing in the manner described in the FIG. 18 example.

Radio Hole Detection and Removal Algorithm—FIG. 19

FIG. 19 depicts the process whereby cell 411-15 in FIG. 17 compensates for a radio hole by enlarging to the area of cell 411-15' in FIG. 18 to cover the area previously covered by the nonworking cell 411-16. Several cells may participate in order to fill the radio hole. In some environments, 100% coverage of the radio hole may not be possible, particularly near the edge of the coverage range of a region 211 of FIG. 4 or in inaccessible areas of a cell.

There are a number of conditions for alerting cell 411-15 in FIG. 17 to the non-operation of cell 411-16. In FIG. 19, the first condition is MISSING FREQUENCY DETECTED and the second condition is BROADCAST FROM FAILED P-BTS RECEIVED. The first condition occurs when during the normal scanning process of the P-BTS, the detecting P-BTS fails to find a previously noted frequency from another P-BTS. As a result of the first condition, the detecting P-BTS may send a check message to the "non-operational" P-BTS to make sure the "non-operational" P-BTS is really non-operational and not simply reduced its power level in response to some other operational requirement (for example, operator directed power reduction or introduction of a new cell in the network).

The second condition occurs when a failed P-BTS realizes that it is no longer able to broadcast on the selected frequency and therefore broadcasts a non-operation message to all the P-BTSs that are in the non-operational P__BTS's neighbor list. The information contained in the broadcast non-operation message accurately identifies the non-operational P-BTS and any relevant parameters, for example, the power level that was being used on the broadcast channel prior to going non-operational.

Other conditions (OTHER CONDITIONS) may also alert a P-BTS of a radio hole. For example, although not explicitly shown in FIG. 19, the P-BTS may detect the non-operation of another P-BTS by the use of uplink measurement data from a Mobile Station that is active in a call and located on cell 411-15. Also it is possible that more than one of the conditions will occur simultaneously.

Regardless as to the one or more triggering conditions, a non-operation is detected in FIG. 19 by the step RADIO HOLE DETECTED. Once the non-operation has been detected, the P-BTS determines if the failed cell was a neighbor cell by the test NEIGHBOR CELL?. If not a neighbor cell, then the activation of a power increase algorithm by the detecting P-BTS is likely to be futile and may lead to an increase in interference for other cells. If the failed cell is determined to be a neighbor cell, then the algorithm proceeds to retrieve the previously stored information for the failed cell (RETRIEVE POWER LEVEL). Based on the retrieved information the P-BTS calculates the required power level (CALCULATE REQUIRED POWER LEVEL) that will be necessary for the detecting P-BTS to cover the whole (or a part of) the area between the detecting P-BTS and failed P-BTS.

As an assistance to or as an alternative, the detecting P-BTS can use the information broadcast by the failed BTS since that information is likely to be the most current information about the non-operational P-BTS. The algorithm for calculating the power level, as a first approximation, is based on well-known RF propagation models. Once the new estimate of the required power level has been calculated, the detecting P-BTS sets this power level (SET NEW OUTPUT) for its broadcast channel and the transmit power level is checked (Check TX PWR). The sequence of steps after this calculation are almost identical to the installation phase shown in FIG. 13 since the state of the network after a non-operation is essentially identical to a new installation phase. It may be that under certain circumstances the required power level is greater than the design limit of the detecting P-BTS, in which case, the detecting P-BTS must make a "best effort" attempt to cover the radio hole or some portion of it. In a similar manner, other detecting P-BTSs will similarly attempt to cover the radio hole. Together, it is frequently the case, that the radio hole will not be covered by a single detecting P-BTS but rather by the separate action of several neighbor detecting P-BTS.

With the P-BTS deployed with LAN interconnection to other P-BTS, the P-BTS typically broadcast its identity together with the frequency and power settings that the detecting P-BTS is going to use. The broadcast is over the LAN (BROADCAST FREQ & POWER SETTINGS) as shown in FIG. 19 to other BTSs within its domain (region 211 of FIG. 4, for example). The other receiving BTSs connected by the LAN store this information along with the broadcasting BTS's identity for future use. Other BTSs can then respond to the detecting P-BTS with the RECEIVE OTHER FREQ/PWR SETTINGS operation with reports on the performance of the new settings of the detecting BTS. This report includes the frequency set and power level for the detecting P-BTS as received by the neighboring and other P-BTS in the region. Based upon this information the detecting P-BTS can then reset its power level in the UPDATE PWR SETTING operation as a result of the Reset PWR? determination if YES or bypass the power update if NO. The COMPLETE? determination if NO causes the re-entry of the installation phase and repeat of the whole process commencing at the BROADCAST FREQ & POWER SETTINGS operation. The COMPLETE? determination if YES causes the control to flow to the operational phase 2 of FIG. 14.

If the newly set TX frequency and power levels for the detecting P-BTS are acceptable, then the P-BTS proceeds to setup the neighbor cell information required for handover purposes. When the TX power from the broadcasting P-BTS and the RSSI at the receiving P-BTS are known, it is possible to approximate the distance between the broadcasting and receiving P-BTSs, provided the path is or approximates free space, and this distance information helps with handover performance. The neighbor cell information is calculated from the response to the TX Frequency and power request to neighboring BTSs. It is assumed that the P-BTSs that respond with a RSSI value for the newly adjusted P-BTS are potential handover candidates. Also based on the RSSI value received and the known TX power level, the handover power level thresholds for handover candidates are set (these values can be simple subtractions of power levels). Similarly, the P-BTS receiving the broadcasts from the newly adjusted detecting P-BTS can use the data to set up their new handover candidate lists, provided they can detect the new P-BTS. Any P-BTS that cannot detect the TX frequency of a newly adjusted P-BTS will not be set as a candidate handover BTS. Each of the P-BTSs retains the information for use in future changed situations. When the newly adjusted detecting P-BTS is in the operational phase, it receives transmissions from other adjusting P-BTSs and updates the domain profile accordingly.

Figure 22:
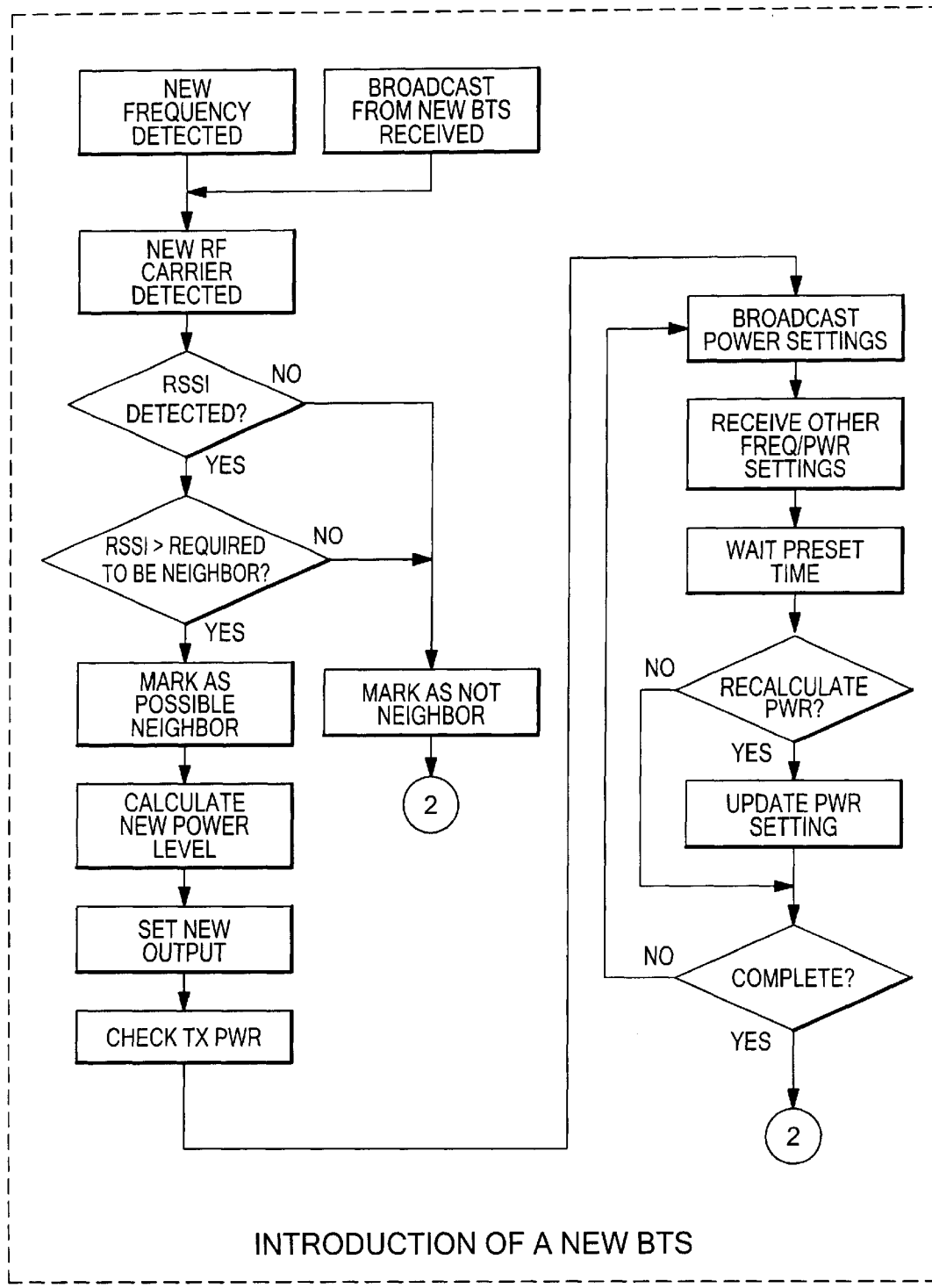
FIG. 22 depicts a flow diagram of the control algorithm for adjusting neighboring cells in response to the added cell described in the FIG. 21 example.

As an alternative to the completely autonomous algorithm of FIG. 22, a centralized control algorithm is employed where a designated P-BTS or a centralized OAM server act as the coordination element to control the power level changes and system tuning in response to a radio hole. This centralized control algorithm collects the results of measuring the power levels received from all the neighboring P-BTSs surrounding a radio hole under the control of the designated P-BTS. The co-ordination function sends new power level settings to the affected neighboring P-BTSs in order to fill the radio hole. This operation uses algorithms analogous to those in FIG. 19.

Figure 20:
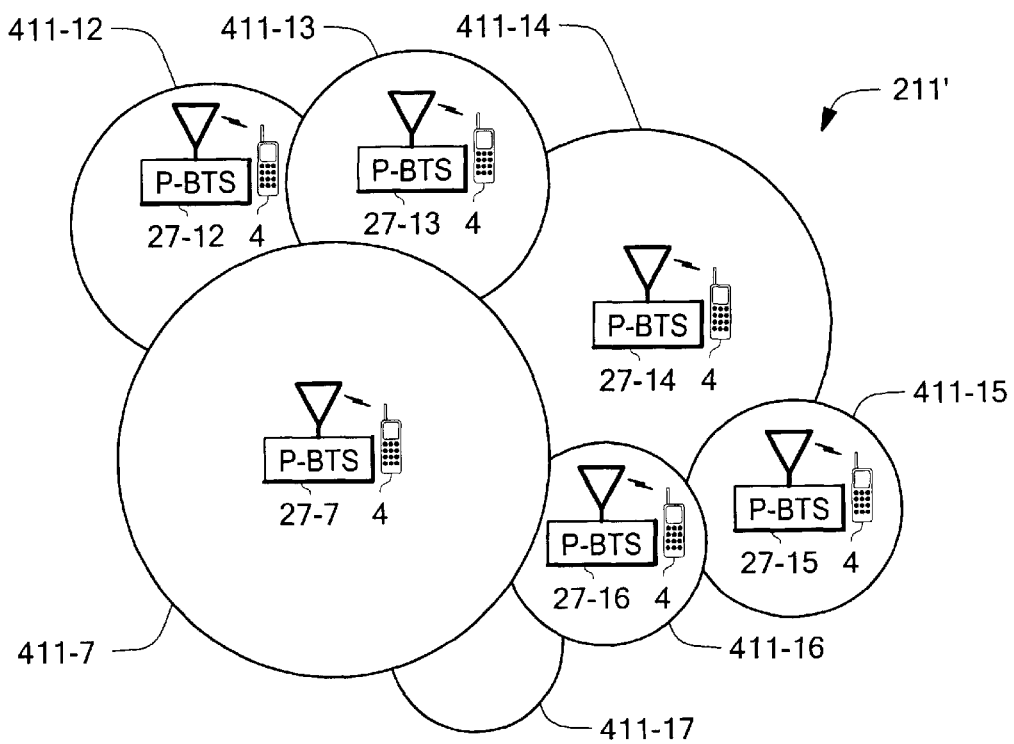
FIG. 20 depicts a representation of eight cells from the private wireless region of FIG. 4.
Figure 21:
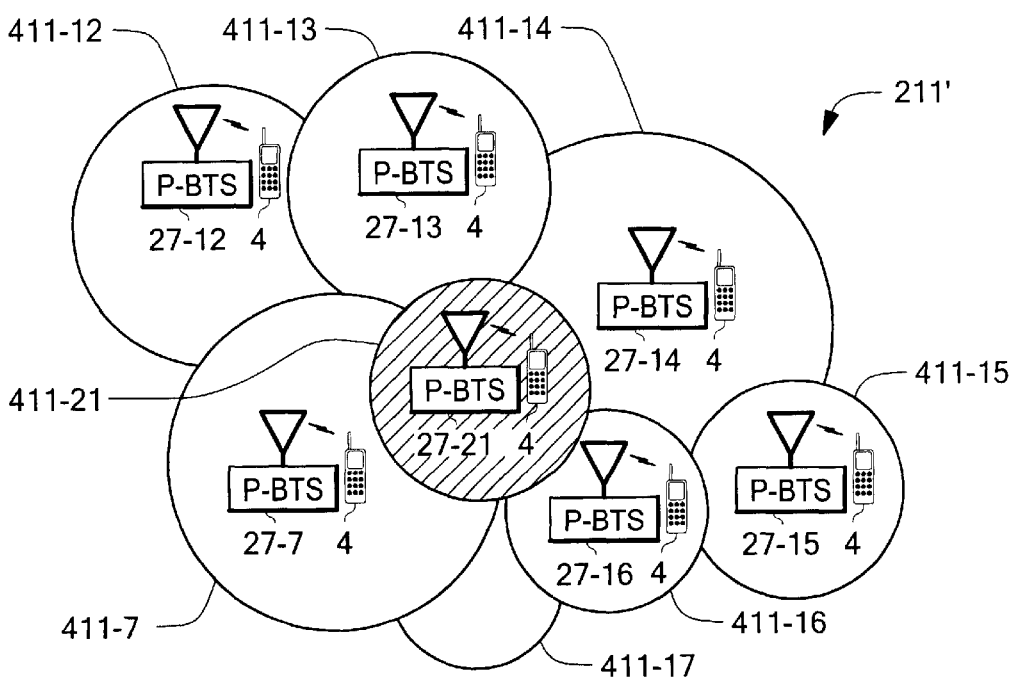
FIG. 21 depicts a representation of eight cells of FIG. 20 with an additional cell added.

Introduction Of New Cell and BTS—FIG. 20 And FIG. 21.

In FIG. 20, a portion 211' of the private region 211 of FIG. 3 is shown including a number of the private cells 411 and specifically the private cells 411-7, 411-12, ..., 411-17. The cells 411-7, 411-12, ..., 411-17 have the corresponding private BTSs (P-BTSs) 27-7, 27-12, ..., 27-17. In FIG. 21, the portion 211' of the private region 211 of FIG. 20 is to be modified by adding a new cell 411-21 together with its new P-BTS 27-21. When the P-BTS 27-21 is added, the neighbor P-BTS 27-7, 27-12, ..., 27-17 in the neighbor cells 411-7, 411-12, ..., 411-17 detect the addition of P-BTS and take responsive action to balance the network in the region 211.

New Cell Algorithm—FIG. 22.

FIG. 22 depicts the process that results when a new cell 411-21 is introduced into the network region 211 ' as depicted by FIG. 21. With the new cell introduction, each of the neighbor P-BTS execute algorithms that compensate for the addition of the new radio coverage provided by the new cell. The addition of a new P-BTS has several impacts on the network. The major impact is the addition of a new radio carrier which can potentially increase the interference level for the neighboring P-BTSs. The neighboring P-BTSs, of course, also can cause interference to new cells and, therefore, the neighbor cells may need to reduce their carrier power or change carrier frequency. If a need to change carrier frequency and redefine the frequency plan is determined, by the operator or other means, then the installation phase is used to perform this function.

In the FIG. 22 example, it is assumed that the addition of new cell 411-21 does not require any of the neighboring cells 411-7, 411-12, ..., 411-17 to change frequency. There are a number of conditions for alerting neighboring cells 411-7, 411-12, ..., 411-17 to the addition of the new P-BTS 411-21. In FIG. 22, a first condition is NEW FREQUENCY DETECTED and a second condition is BROADCAST FROM NEW BTS RECEIVED. The first condition occurs when during the normal scanning process by neighboring P-BTSs, a neighboring P_BTS finds that a previously unoccupied frequency has some radiated power. The second case occurs when the new P-BTS 41-121 comes on air as part of an installation process. The information contained in the broadcast over the LAN accurately identifies the new P-BTS and any relevant parameters, for example, the power level being used on the broadcast channel. It is possible that both conditions occur simultaneously.

Once the new P-BTS 411-21 has been detected (NEW RF CARRIER DETECTED), the detecting P-BTS determines if the new cell is a neighbor cell. If the new cell is not a neighbor to the detecting cell, then activating any power decrease algorithm is futile and likely to reduce performance that is not compensated by the new cell. The first step in determining this state is to determine if RSSI is detected (RSSI DETECTED?) and if (YES) then to measure the strength of the RSSI to determine if it is strong enough to be a neighbor (RSSI>REQUIRED TO BE NEIGHBOR?). If strong enough to be a neighbor (YES), then the processing can continue and otherwise (NO) the new P-BTS can be ignored. If not present or not strong enough (NO), the new cell is marked as not a neighbor (MARK AS NOT NEIGHBOR) and returns to the operational phase of FIG. 14. If strong enough (YES), the new cell is marked as a possible neighbor (MARK AS POSSIBLE NEIGHBOR). Based on the RSSI strength, the P-BTS calculates the apparent distance to the new P-BTS using well know RF propagation equations. The new power level is set (SET NEW OUTPUT) for its broadcast channel based upon the outcome of this calculation and the transmit power level is checked (Check TX PWR). The intent, in the first approximation, is to split the distance equally between the two P-BTSs, that is, between the detecting P-BTS and the new P-BTS. Once a new setting has been determined, the detecting P-BTS broadcasts (BROADCAST POWER SETTINGS) this information to surrounding cells in the network. Similarly, the detecting P-BTS receives information from other P-BTS (RECEIVE OTHER FREQ/PWR SETTINGS). This operation by its very nature may have impacts on the neighbor cells, hence the introduction of the new cell will ripple out to the very edge of the coverage or to a distance where a discontinuity occurs in the coverage, for example, at the edge of a building. It is necessary to avoid the situation where the P-BTSs in the network do not reach stable states and are continuously oscillating between different power levels.

To avoid unwanted oscillations, safeguards are introduced into the algorithm of FIG. 22. One safeguard is to introduce a time delay (WAIT PRESET TIME) such that the effects of the new P-BTS have time to ripple to the edge of the coverage before any further changes are made to the network. By using this wait time parameter, all changes will ripple out from the new cell to the edge of coverage rather than immediately reflecting back before the edge is reached and thereby causing oscillations.

Based upon the broadcast information from neighboring P-BTS and upon measure and calculated information, the detecting P-BTS determines whether to recalculate its power level (RECALCULATE PWR?) and if (YES), updates its power level in the UPDATE PWR SETTING operation or bypasses the power update if NO. The COMPLETE? determination if NO causes the re-entry of the installation phase and repeat the whole process commencing at the BROADCAST FREQ & POWER SETTINGS operation. The COMPLETE? determination if YES causes the control to flow to the operational phase 2 of FIG. 14.

Another safeguard that prevents oscillations is to provide a window of coverage that allows a "good enough" threshold to the algorithm of FIG. 22 whereby the network is able to exist safely with some level of interference in the coverage, provided that all radio holes are covered. Another safeguard is to prevent the outer neighboring cells from falsely determining that a reduction in power of a surrounding cell is a non-operation of the cell. In this case, a message is sent to the "failing" cell to determine if the cell has failed or simply responding to changes in the surrounding network. If the P-BTS receives a change of power level broadcast from a neighbor cell then it can assume that the perceived change in the power level was due to environmental or tuning changes rather than P-BTS non-operation. After the preset time has expired, the P-BTS assumes that all the necessary changes have rippled through the network and can proceed to recalculate the optimum power level based on received power levels from the other P-BTS. This refinement process is very similar to that found in the installation phase.

As an alternative to the completely autonomous algorithm of FIG. 22 centralized control algorithm is employed where a designated P-BTS or a centralized OAM server act as the coordination element to control the power level change and system tuning. This algorithm collects the a results of measuring the power levels received from the new P-BTS from all the P-BTSs under the control of the designated P-BTS. The co-ordination function sends new power level settings to the affected neighboring P-BTSs. This operation uses algorithms analogous to those in FIG. 22 to deal with the addition of new P-BTSs.

While the invention has been particularly shown and described with reference to preferred embodiments thereof it will be understood by those skilled in the art that various changes in form and details may be made therein without departing from the scope of the invention.

What is claimed is:

1. A base station for use in a wireless communication system, the base station providing wireless signal coverage in a cell, where the cell is one of a plurality of cells in a cellular region serviced by the wireless communication system, the base station comprising:
   a packet network interface, for connecting the base station to a packet network that links the base station to at least one other base station in the cellular region, wherein the other base station is used to provide wireless signal coverage in another cell in the cellular region;
   a transmitter, for transmitting a measurement report corresponding to a transmitting frequency parameter and a transmitting power parameter of a particular cell signal, the measurement report being transmitted over the packet network;
   a parameter detector, for detecting other parameters of a cell signal for at least the other cell in the cellular region, the other parameters detected from the other cell via the packet network interface as a measurement report corresponding to a transmitting frequency parameter and a transmitting power parameter of the other cell; and
   a parameter controller, for controlling the particular parameters of the particular cell signal base upon the other parameters for the other cell, so that the particular cell signal does not interfere with other cell signals in the cellular region.

2. The base station of claim 1 wherein said parameter detector comprises:
   a Radio Frequency (RF) scanner for scanning for the other cell signals from the other cells in the cellular region; and
   a parameter processor for processing the other cell signals to determine the other parameters for the other cell signals.

3. The base station of claim 1 wherein said parameter controller includes a control algorithm for automatic parameter assignment of the particular parameters.

4. The base station of claim 3 wherein said control algorithm selects among operator control, local craft control and autonomous control modes of operation.

5. The base station of claim 1 wherein said parameter controller includes a control algorithm having an autonomous control mode for automatic parameter assignment of the particular parameters.

6. The base station of claim 5 wherein said autonomous control mode includes an installation phase for installing the base station with the particular parameters, an operational phase for changing the particular parameters, and a maintenance phase for measuring other parameters for the other cells.

7. The base station of claim 6 wherein said installation phase includes,
   a signal strength detector, for measuring a received signal strength for each of n frequencies,
   a selector, for selecting a particular frequency from the n frequencies based upon the measured received signal strength; and
   a power level controller, for setting the power of the particular frequency.

8. The base station of claim 6 wherein said operational phase further includes:
   an other parameter calculator for calculating other frequency parameters and other power parameters for the other cell signals from the other cells in the cellular region;
   a particular value calculator for calculating values of the particular frequency parameter and the particular power parameter for the particular cell signal; and
   a particular parameter controller, for setting the particular frequency parameter and the particular power parameter with the calculated values.

9. The base station of claim 6 wherein said maintenance phase includes:
   a signal strength detector, for measuring a received signal strength for each of n frequencies to determine a set of frequency parameters for the other cells;
   a comparator, for determining if the set of frequency parameters has changed and for initiating transfer to the operational phase in response to such changes.

10. The base station of claim 1 wherein said parameter controller includes a control algorithm having an autonomous control mode for automatic parameter assignment of the particular parameters, said control algorithm operating to detect a radio hole created by a disappearance of one of said other cell signals and to adjust the particular parameters of said particular cell signal to compensate for said disappearance.

11. The base station of claim 1 wherein said parameter controller includes a control algorithm having an autonomous control mode for automatic parameter assignment of the particular parameters, said control algorithm operating to detect a new radio signal created by an appearance of a new one of said other cell signals and to adjust the particular parameters of said particular cell signal to compensate for said appearance.

12. The base station of claim 1 wherein said plurality of cells form a private wireless network operating with a wireless protocol for communications with wireless stations located in the cells and wherein said base station further includes:
   an interface to a private wired network operating with a wired packet protocol, this interface thus serving as an interconnect between the private wireless network and the private wired network; and
   an interface protocol, for interfacing the wireless protocol and the wired packet protocol whereby wireless stations operating with the wireless protocol may then communicate with the wired packet protocol.

13. The base station of claim 12 wherein said wireless protocol is TDMA or CDMA.

14. The base station of claim 12 wherein said wired packet protocol is Internet Protocol.

15. The base station of claim 12 wherein said private wired network includes one or more local area networks and said interface to a private wired network additionally connects the private wireless network to said local area networks.

16. The base station of claim 12 further including an interface to a public wired network and an interface to a public wireless network, and wherein
said interface to the public wireless network uses said wireless protocol so that said wireless stations may communicate in said public wireless network and said private wireless network,
said interface to said private wired network includes interfaces to one or more local area networks and whereby wireless stations operating in said private wireless network may thus communicate with said public wired network through said private wired network and whereby wireless stations operating in said public wireless network communicate through said private wired network.

17. The base station of claim 16 wherein said public networks include at least one of the Internet, PSTN and ISDN.

18. The base station of claim 12 wherein the interface to the private wired network includes one or more local area networks and said private wired network connects the private wireless network to said public wireless network.

19. The base station of claim 16 wherein said wireless stations have integrated voice and data operations.

20. The base station of claim 16 wherein the interface to the public wireless network supports a public wireless network using said wireless protocol whereby said wireless stations communicate in said public wireless network and said private wireless network.

21. The base station of claim 16 wherein said wireless stations communicate at data rates of the public wireless network when communicating over the public wireless network.

22. The base station of claim 16 wherein said wireless stations communicate at data rates of the private wireless network when communicating over the private wireless network.

23. The base station of claim 16 wherein said public wireless network interface includes an interface to connect to a public BSC, to a public MSC and to a public HLR, to enable wireless stations to make calls using said public wireless network.

24. The base station of claim 23 wherein said wireless stations do not require use of said public BSC, said public MSC, or said public HLR interface for calls using said private wireless network.

25. The base station of claim 12 wherein said wireless protocol is TDMA or CDMA and has a wireless call build/teardown sequence, and said wired packet protocol includes at least one of H.225, H.245 and H.323, and has wired packet call build/teardown sequence and wherein said interface to a private wired network integrates said wireless call build/teardown sequence and integrates said wireless call build/teardown sequence with said wired packet call build/teardown sequence.

26. The base station of claim 12 wherein said private wireless network includes one or more wireless cells and said private wireless network is connected to a cell service controller for controlling which ones of said cells service which one of the wireless stations.

27. The base station of claim 26 wherein said cell service controller includes a handover controller for controlling handover of wireless stations from one of said cells to other of said cells.

28. The base station of claim 12 wherein said private wireless network includes one or more private base transceiver stations, each private base transceiver station establishing wireless communication using said wireless protocol, with said wireless stations located in a cell within the private wireless network.

29. The base station of claim 12 wherein said private wireless network includes a plurality of private transceiver stations, each private base transceiver station establishing wireless communication, using said wireless protocol, with said wireless station located one or more cells within the private network, and wherein said interface to a private wired network includes a hub for connecting said plurality of private base transceiver stations together in a local area network.

30. The base station of claim 29 wherein said local area network includes a gatekeeper for providing control functions for operation of the wireless stations according to the private wired packet protocol.

31. The base station of claim 30 wherein said gatekeeper includes a gatekeeper database and an encoder/decoder for registration, administration and status messages.

32. The base station of claim 29 wherein said local area network includes a router for providing control functions for routing calls between the private network and the public networks.

33. The base station of claim 32 wherein said public networks include at least one of PSTN, ISDN and Internet networks.

34. The base station of claim 22 wherein said interface to a private wired network includes one or more gateways for providing control functions for the wireless stations for converting the wired packet protocol to a public network protocol for said PSTN and/or ISDN networks.

35. The base station of claim 34 wherein said public network protocol is a PSTN protocol.

36. The base station of claim 34 wherein said public network protocol is an ISDN protocol.

37. A method used by a particular wireless base station to provide coverage in a cell, the cell being one of a plurality of cells, where each cell covers a portion of a cellular region and where each cell has a corresponding base station, the method comprising:
transmitting a measurement report corresponding to a transmitting frequency parameter and a transmitting power parameter of a particular cell signal, where the particular cell signal covers a particular portion of the cellular region associated with particular the base station, the measurement report being transmitted on a packet network connection for connecting the base stations;
detecting other parameters of other cell signals for other cells in the cellular region, the step of detecting further comprising receiving a measurement report corresponding to the transmitting frequency parameter and the transmitting power parameter of the other cells, the other measurement reports being received on a packet network connection for connecting to the other base stations; and
controlling the particular parameters for the particular cell based upon the other parameters for the other cell signals so that the particular cell signal does not interfere with the other cell signals in the cellular region.

38. A method as in claim 37 wherein said step of detecting other parameters additionally comprises:
scanning for the other cell signals from the other cells in the cellular region; and processing the other cell signals to determine the other parameters for the other cell signals.

39. A method as in claim 37 additionally comprising the step of:

assigning parameter values to the particular parameters.

40. A method as in claim 39 wherein said assigning step selects among operator control, local craft control and autonomous control modes of operation.

41. A method as in claim 37 wherein said controlling step comprises an autonomous control mode for automatic parameter assignment of the particular parameter valves.

42. A method as in claim 41 wherein said autonomous control mode includes an installation phase for installing the base station with the particular parameters, an operational phase for changing the particular parameters and a maintenance phase for measuring other parameters for the other cells.

43. A method as in claim 42 wherein said installation phase includes the steps of:

measuring a received signal strength for each of n frequencies;

selecting a particular frequency from the n frequencies based upon the measured received signal strength;

setting the power of the particular frequency;

broadcasting the particular frequency and the particular power to other base stations for other cells; and receiving the other parameters from the other cells.

44. A method as in claim 42 wherein said operational phase includes the steps of:

calculating other frequency parameters and other power parameters for the other cell signals from the other cells in the cellular region;

calculating values of the particular frequency parameter and the particular power parameter for the particular cell signal; and setting the particular frequency parameter and the particular power parameter with the calculated values and transferring to the operational phase.

45. A method as in claim 42 wherein said maintenance phase includes the steps of:

measuring a received signal strength for each of the n frequencies to determine a set of frequency parameters for the other cells;

detecting if the set of frequency parameters has changed; and transferring to the operational phase in response to such detected change.

46. A method as in claim 37 wherein controlling step has an autonomous control mode for automatic parameter assignment of the particular parameters, said control algorithm operating to detect a radio hole created by a disappearance of one of said other cell signals, and adjusting the particular parameters of said particular cell signal to compensate for said disappearance.

47. A method as in claim 37 wherein said controlling step has an autonomous control mode for automatic parameter assignment of the particular parameters, said control algorithm operating to detect a new radio signal created by an appearance of a new one of said other cell signals, and adjusting the particular parameters of said particular cell signal to compensate for said appearance.

48. A computer program product comprising a computer readable medium having stored thereon a set of computer instructions embodied on the computer readable medium, including instructions for use by a particular wireless base station to provide coverage in a cell being one of a plurality of cells, where each cell covers a portion of a cellular region and where each cell has a corresponding base station, comprising instructions for:

transmitting a measurement report corresponding to a transmitting frequency parameter and a transmitting power parameter of a particular cell signal, where the particular cell signal covers a particular portion of the cellular region associated with particular the base station, the measurement report being transmitted on a packet network connection for connecting the base stations;

detecting other parameters of other cell signals for other cells in the cellular region, the step of detecting further comprising receiving a measurement report corresponding to the transmitting frequency parameter and the transmitting power parameter of the other cells, the other measurement reports being received on a packet network connection for connecting to the other base stations; and controlling the particular parameters for the particular cell based upon the other parameters for the other cell signals so that the particular cell signal does not interfere with the other cell signals in the cellular region.

49. A computer program product as in claim 48 wherein said instructions for detecting other parameters additionally comprise instructions for:

scanning for the other cell signals from the other cells in the cellular region; and processing the other cell signals to determine the other parameters for the other cell signals.

50. A computer program product as in claim 48 additionally comprising instructions for assigning parameter values to the particular parameters.

51. A computer program product as in claim 50 wherein said instructions for said assigning step selects among operator control, local craft control and autonomous control modes of operation.

52. A computer program product as in claim 48 wherein said instructions for said controlling step comprise an autonomous control mode for automatic parameter assignment of the particular parameter valves.

53. A computer program product as in claim 52 wherein said instructions for said autonomous control mode include an installation phase for installing the base station with the particular parameters, an operational phase for changing the particular parameters and a maintenance phase for measuring other parameters for the other cells.

54. A computer program product as in claim 53 wherein said instructions for said installation phase further comprise instructions for:

measuring a received signal strength for each of n frequencies;

selecting a particular frequency from the n frequencies based upon the measured received signal strength;

setting the power of the particular frequency;

broadcasting the particular frequency and the particular power to other base stations for other cells; and receiving the other parameters from the other cells.

55. A computer program product as in claim 53 wherein said instructions for said operational phase further comprise instructions for:

calculating other frequency parameters and other power parameters for the other cell signals from the other cells in the cellular region;

calculating values of the particular frequency parameter and the particular power parameter for the particular cell signal; and setting the particular frequency parameter and the particular power parameter with the calculated values and transferring to the operational phase.

56. A computer program product as in claim 53 wherein said instructions for said maintenance phase further comprise instructions for:

measuring a received signal strength for each of the n frequencies to determine a set of frequency parameters for the other cells.

57. A computer program product as in claim 56 wherein said instructions for said maintenance phase further comprise instructions for:

detecting if the set of frequency parameters has changed; and transferring to the operational phase in response to such detected change.

58. A computer program product as in claim 48 wherein said instructions for said controlling additionally comprise an autonomous control mode for automatic parameter assignment of the particular parameters, said control algorithm operating to detect a radio hole created by a disappearance of one of said other cell signals, and adjusting the particular parameters of said particular cell signal to compensate for said disappearance.

59. A computer program product as in claim 48 wherein said instructions for said controlling step additionally comprise instructions for an autonomous control mode for automatic parameter assignment of the particular parameters, said control algorithm operating to detect a new radio signal created by an appearance of a new one of said other cell signals, and adjusting the particular parameters of said particular cell signal to compensate for said appearance.

60. A computer program product as in claim 48 wherein said packet network uses an Internet Protocol.

61. A base station for use in a wireless communication system, the base station providing wireless signal coverage in a cell, where the cell is one of a plurality of cells in a cellular region serviced by the wireless communication system, the base station comprising:

means for interfacing the base station to a packet network that links the base station to at least one other base station in the cellular region, wherein the other base station is used to provide wireless signal coverage in another cell in the cellular region;

means for transmitting a measurement report corresponding to a transmitting frequency parameter and a transmitting power parameter of a particular cell signal, the measurement report being transmitted over the packet network;

means for detecting other parameters of a cell signal for at least the other cell in the cellular region, the other parameters detected from the other cell via the network interface as a measurement report corresponding to a transmitting frequency parameter and a transmitting power parameter of the other cell; and means for controlling the particular parameters of the particular cell signal base upon the other parameters for the other cell, so that the particular cell signal does not interfere with other cell signals in the cellular region.

62. The base station of claim 61 wherein said parameter detector comprises:

means for scanning a Radio Frequency (RF) of the other cell signals from the other cells in the cellular region; and means for processing the other cell signals to determine the other parameters for the other cell signals.

63. The base station of claim 61 wherein said means for controlling the particular parameters include a control algorithm for automatic parameter assignment of the particular parameters.

64. The base station of claim 63 wherein said control algorithm selects among operator control, local craft control and autonomous control modes of operation.

65. The base station of claim 61 wherein said means for controlling the particular parameters includes a control algorithm having an autonomous control mode for automatic parameter assignment of the particular parameters.

66. The base station of claim 65 wherein said autonomous control mode includes an installation phase for installing the base station with the particular parameters, an operational phase for changing the particular parameters, and a maintenance phase for measuring other parameters for the other cells.

67. The base station of claim 66 wherein said installation phase includes means for measuring a received signal strength for each of n frequencies;

means for selecting a particular frequency from the n frequencies based upon the moaned received signal strength; and means for setting a power level at the particular frequency.

68. The base station of claim 66 wherein said operational phase further includes:

means for calculating other frequency parameters and other power parameters for the other cell signals from the other cells in the cellular region;

means for calculating values of the particular frequency parameter and the particular power parameter for the particular cell signal; and means for setting the particular frequency parameter and the particular power parameter with the calculated values.

69. The base station of claim 66 wherein said maintenance phase includes:

means for measuring a received signal strength for each of n frequencies to determine a set of frequency parameters for the other cells;

means for determining if the set of frequency parameters has changed; and means for initiating transfer to the operational phase in response to such changes.

70. The base station of claim 61 wherein said means for controlling the particular parameters includes a control algorithm having an autonomous control mode for automatic parameter assignment of the particular parameters, said control algorithm operating to detect a radio hole created by a disappearance of one of said other cell signals and to adjust the particular parameters of said particular cell signal to compensate for said disappearance.

71. The base station of claim 61 wherein said means for controlling the particular parameters includes a control algorithm having an autonomous control mode for automatic parameter assignment of the particular parameters, said control algorithm operating to detect a new radio signal created by an appearance of a new one of said other cell signals and to adjust the particular parameters of said particular cell signal to compensate for said appearance.

72. The base station of claim 61 wherein said plurality of cells form a private wireless network operating with a wireless protocol for communications with wireless stations located in the cells and wherein said base station further includes:

means for connecting a private wired network operating with a wired packet protocol, this interface means thus serving as an interconnect between the private wireless network and the private wired network; and means for interfacing the wireless protocol and the wired packet protocol whereby wireless stations operating with the wireless protocol may then communicate with the wired packet protocol.

73. The base station of claim 72 wherein said wireless protocol is TDMA or CDMA.

74. The base station of claim 72 wherein said wired packet protocol is Internet Protocol.

75. The base station of claim 72 wherein said private wired network includes one or more local area networks and said interface means for a private wired network additionally connects the private wireless network to said local area networks.

76. The base station of claim 72 further including means for connecting a public wired network and for interfacing to a public wireless network, and wherein said interface means to the public wireless network uses said wireless protocol so that said wireless stations may communicate in said public wireless network and said private wireless network; and means for connecting to a private wired network includes interfaces to one or more local area networks;

whereby wireless stations operating in said private wireless network may thus communicate with said public wired network through said private wired network; and whereby wireless stations operating in said public wireless network communicate through said private wired network.

77. The base station of claim 76 wherein said public networks include at least one of the Internet, PSTN and ISDN.

78. The base station of claim 72 wherein said means for connecting to the private wired network includes one or more local area networks and said private wired network connects the private wireless network to said public wireless network.

79. The base station of claim 76 wherein said wireless stations have integrated voice and data operations.

80. The base station of claim 76 wherein said means for interfacing to a public wireless network supports a public wireless network using said wireless protocol whereby said wireless stations communicate in said public wireless network and said private wireless network.

81. The base station of claim 76 wherein said wireless stations communicate at data rates of the public wireless network when communicating over the public wireless network.

82. The base station of claim 76 wherein said wireless stations communicate at data rates of the private wireless network when communicating over the private wireless network.

83. The base station of claim 76 wherein said means for interfacing to a public wireless network includes an interface to connect to a public BSC, to a public MSC and to a public HLR, to enable wireless stations to make calls using said public wireless network.

84. The base station of claim 83 wherein said wireless stations do not require use of said public BSC, said public MSC, or said public HLR interface for calls using said private wireless network.

85. The base station of claim 72 wherein said wireless protocol is TDMA or CDMA and has a wireless call build/teardown sequence, and said wired packet protocol includes at least one of H.225, H.245 and H.323, and has wired packet call build/teardown sequence and wherein said interface means to a private wired network integrates said wireless call build/teardown sequence and integrates said wireless call build/teardown sequence with said wired packet call build/teardown sequence.

86. The base station of claim 72 wherein said private wireless network includes one or more wireless cells and said private wireless network is connected to a cell service controller for controlling which ones of said cells service which one of the wireless stations.

87. The base station of claim 86 wherein said cell service controller includes a handover controller for controlling handover of wireless stations from one of said cells to other of said cells.

88. The base station of claim 72 wherein said private wireless network includes one or more private base transceiver stations, each private base transceiver station establishing wireless communication using said wireless protocol, with said wireless stations located in a cell within the private wireless network.

89. The base station of claim 72 wherein said private wireless network includes a plurality of private base transceiver stations, each private base transceiver station establishing wireless communication, using said wireless protocol, with said wireless station located one or more cells within the private network, and wherein said interface means to a private wired network includes a hub for connecting said plurality of private base transceiver stations together in a local area network.

90. The base station of claim 89 wherein said local area network includes a gatekeeper for providing control functions for operation of the wireless stations according to the private wired packet protocol.

91. The base station of claim 90 wherein said gatekeeper includes a gatekeeper database and an encoder/decoder for registration, administration and status messages.

92. The base station of claim 89 wherein said local area network includes a router for providing control functions for routing calls between the private network and the public networks.

93. The base station of claim 92 wherein said public networks include at least one of PSTN, ISDN and Internet networks.

94. The base station of claim 92 wherein said means for interfacing to a private wired network includes one or more gateways for providing control functions for the wireless station for converting the wired packet protocol to a public network protocol for said PSTN and/or ISDN networks.

95. The base station of claim 94 wherein said public network protocol is a PSTN protocol.

96. The base station of claim 94 wherein said public network protocol is an ISDN protocol.

* * * * *

UNITED STATES PATENT AND TRADEMARK OFFICE
CERTIFICATE OF CORRECTION

PATENT NO.   : 6,729,929 B1
DATED        : May 4, 2004
INVENTOR(S)  : Ian Leslie Sayers, Paul Jan Long and Peter Kendall Cripps It is certified that error appears in the above-identified patent and that said Letters Patent is hereby corrected as shown below:

Column 36,
Line 25, delete "moaned" and insert -- measured --

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,729,929 B1 | Page 1 of 1 |
| DATED | : May 4, 2004 | |
| INVENTOR(S) | : Ian Leslie Sayers, Paul Jan Long and Peter Kendall Cripps | |

It is certified that error appears in the above-identified patent and that said Letters Patent is hereby corrected as shown below:

Title page,
Item [73], Assignee, delete "CISCO Systems, Inc." and insert -- CISCO Technology, Inc. --.

Signed and Sealed this

Eleventh Day of October, 2005

JON W. DUDAS
*Director of the United States Patent and Trademark Office*